US010137435B2

(12) United States Patent
Artero et al.

(10) Patent No.: US 10,137,435 B2
(45) Date of Patent: Nov. 27, 2018

(54) METHOD FOR PREPARING A CATALYST MEDIATING H$_2$ EVOLUTION, SAID CATALYST AND USES THEREOF

(71) Applicants: COMMISSARIAT A L'ENERGIE ATOMIQUE ET AUX ENERGIES ALTERNATIVES, Paris (FR); FREIE UNIVERSITAT BERLIN, Berlin (DE)

(72) Inventors: Vincent Artero, Quaix en Chartreuse (FR); Marc Fontecave, Saint Ismier (FR); Saioa Cobo, San Sebastian (ES); Pierre-Andre Jacques, Sainte Consorce (FR); Holger Dau, Berlin (DE); Jonathan Heidkamp, Mohorn (DE)

(73) Assignees: COMMISSARIAT A L'ENERGIE ATOMIQUE ET AUX ENERGIES ALTERNATIVES, Paris (FR); UNIVERSITE JOSEPH FOURIER, Grenoble (FR)

( * ) Notice: Subject to any disclaimer, the term of this patent is extended or adjusted under 35 U.S.C. 154(b) by 509 days.

(21) Appl. No.: 14/390,550

(22) PCT Filed: Apr. 4, 2013

(86) PCT No.: PCT/EP2013/057140
§ 371 (c)(1),
(2) Date: Oct. 3, 2014

(87) PCT Pub. No.: WO2013/150116
PCT Pub. Date: Oct. 10, 2013

(65) Prior Publication Data
US 2015/0090604 A1  Apr. 2, 2015

(30) Foreign Application Priority Data

Apr. 5, 2012 (EP) .................................. 12352001

(51) Int. Cl.
*B01J 23/75* (2006.01)
*C25B 1/02* (2006.01)
(Continued)

(52) U.S. Cl.
CPC ............. *B01J 23/75* (2013.01); *B01J 23/755* (2013.01); *B01J 31/16* (2013.01); *C25B 1/02* (2013.01);
(Continued)

(58) Field of Classification Search
CPC .. C25D 3/12; C25B 1/04; B01J 23/75–23/755
See application file for complete search history.

(56) References Cited

U.S. PATENT DOCUMENTS

2010/0101955 A1   4/2010  Nocera et al.
2011/0294044 A1  12/2011  Artero et al.
(Continued)

FOREIGN PATENT DOCUMENTS

EP   2180539 A1    4/2010
WO   2005/118633 A2  12/2005
(Continued)

OTHER PUBLICATIONS

Artero, Vincent et al., "Splitting Water With Cobalt," Angewandte Chemie International Edition, vol. 50, No. 32, Jul. 11, 2011, pp. 7238-7266.
(Continued)

*Primary Examiner* — Nicholas A Smith
(74) *Attorney, Agent, or Firm* — Miles & Stockbridge P.C.

(57) ABSTRACT

The present invention concerns a method for the preparation of a catalyst onto a solid support of a (semi-)conductive material consisting in depositing said catalyst onto said support from a near-neutral aqueous solution containing at least one nickel or cobalt organic complex and at least one
(Continued)

Figure 1:
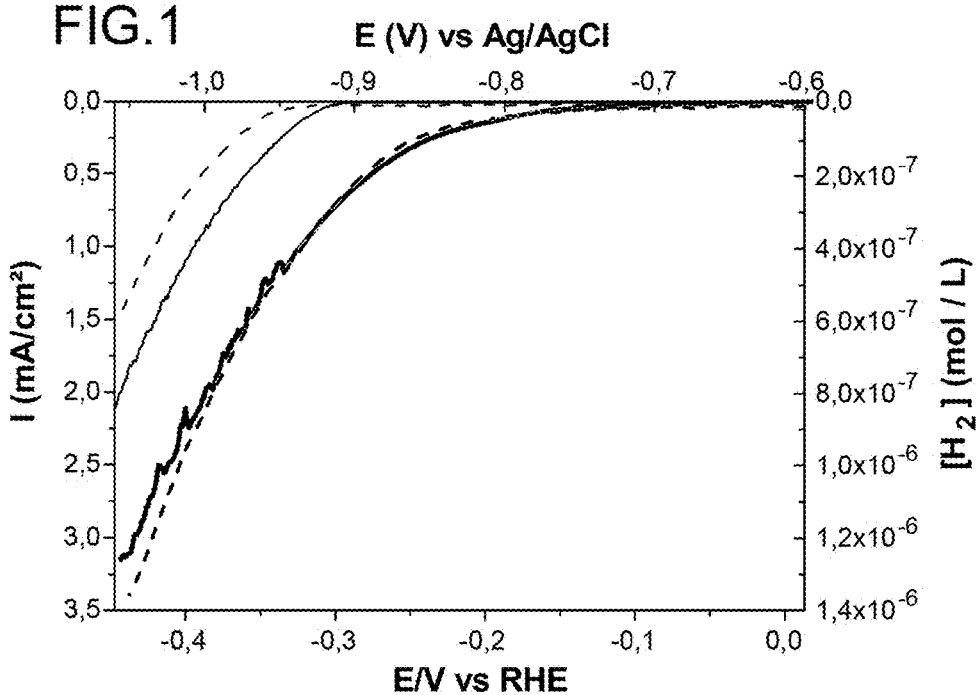

basic oxoanion, by a method selected in the group consisting of reductive electrodeposition, photochemical electrodeposition and photoelectrochemical deposition. The present invention also concerns said catalyst and uses thereof.

18 Claims, 8 Drawing Sheets

(51) Int. Cl.
| | |
|---|---|
| C25B 11/04 | (2006.01) |
| C25D 3/12 | (2006.01) |
| B01J 23/755 | (2006.01) |
| B01J 31/16 | (2006.01) |
| H01M 4/86 | (2006.01) |
| H01M 4/90 | (2006.01) |
| C25D 7/12 | (2006.01) |
| C25D 9/08 | (2006.01) |
| C25D 9/10 | (2006.01) |
| C25D 9/12 | (2006.01) |
| C25D 5/00 | (2006.01) |
| B01J 31/18 | (2006.01) |
| B82Y 40/00 | (2011.01) |
| B82Y 30/00 | (2011.01) |
| B01J 37/16 | (2006.01) |
| B01J 37/34 | (2006.01) |
| B01J 35/00 | (2006.01) |

(52) U.S. Cl.
CPC ...... *C25B 11/0442* (2013.01); *C25B 11/0478* (2013.01); *C25D 3/12* (2013.01); *C25D 5/006* (2013.01); *C25D 7/12* (2013.01); *C25D 9/08* (2013.01); *C25D 9/10* (2013.01); *C25D 9/12* (2013.01); *H01M 4/8657* (2013.01); *H01M 4/9016* (2013.01); *H01M 4/9041* (2013.01); *H01M 4/9075* (2013.01); *H01M 4/9083* (2013.01); *B01J 31/182* (2013.01); *B01J 31/1805* (2013.01); *B01J 31/1835* (2013.01); *B01J 35/0013* (2013.01); *B01J 37/16* (2013.01); *B01J 37/345* (2013.01); *B01J 37/348* (2013.01); *B01J 2531/0244* (2013.01); *B01J 2531/0247* (2013.01); *B01J 2531/845* (2013.01); *B01J 2531/847* (2013.01); *B01J 2540/10* (2013.01); *B82Y 30/00* (2013.01); *B82Y 40/00* (2013.01); *Y02P 20/135* (2015.11)

(56) References Cited

U.S. PATENT DOCUMENTS

| | | | |
|---|---|---|---|
| 2012/0152751 A1* | 6/2012 | Baskaran | C25D 3/38 205/98 |
| 2014/0148575 A1 | 5/2014 | Forge et al. | |

FOREIGN PATENT DOCUMENTS

| | | |
|---|---|---|
| WO | 2009/098403 A2 | 8/2009 |
| WO | 2010/046774 A1 | 4/2010 |

OTHER PUBLICATIONS

International Search Report for International Application No. PCT/EP2013/051740 dated May 31, 2013.
European Search Report for European Application No. EP 12 35 2001 dated Sep. 28, 2012.
Lewis et al., "Powering the planet: Chemical challenges in solar energy utilization", Proc. Natl. Acad. Sci., 2006, vol. 103, No. 43, pp. 15729-15735 (Corrections: Dec. 11, 2007, vol. 104, No. 50, p. 20142).
Kanan et al., "In Situ Formation of an Oxygen-Evolving Catalyst in Neutral Water Containing Phosphate and Co2+", Science, 2008, vol. 321, pp. 1072-1075.
Risch et al., "Cobalt-Oxo Core of a Water-Oxidizing Catalyst Film", J. Am. Chem. Soc., 2009, vol. 131, pp. 6936-6937.
Dau et al., "The Mechanism of Water Oxidation: From Electrolysis via Homogeneous to Biological Catalysis", ChemCatChem, 2010, vol. 2, pp. 724-761.
Dinca, et al., "Nickel-borate oxygen-evolving catalyst that functions under benign conditions", Proc. Natl. Acad. Sci, 2010, vol. 107, No. 23, pp. 10337-10341.
Jiao, et al., "Nanostructured cobalt and manganese oxide clusters as efficient water oxidation catalysts", Energy Environ Sci., 2010, vol. 3, pp. 1018-1027.
Zaharieva et al., "Synthetic manganese-calcium oxides mimic the water-oxidizing complex of photosynthesis functionally and structurally", Energy Environ. Sci, 2011, vol. 4, pp. 2400-2408.
Tran et al., "Noncovalent Modification of Carbon Nanotubes with Pyrene-Functionalized Nickel Complexes: Carbon Monoxide Tolerant Catalysts for Hydrogen Evolution and Uptake", Angew. Chem. Int. Ed., 2011, vol. 50, pp. 1371-1374.
Le Goff, et al., "From Hydrogenases to Noble Metal-Free Catalytic Nanomaterials for H2 Production and Uptake", Science, 2009, vol. 326, pp. 1384-1387 (Supporting Online Material, Dec. 4, 2009, vol. 326, pp. 1-15.
Hou, et al., "Bioinspired molecular co-catalysts bonded to a silicon photocathode for solar hydrogen evolution", Nat. Mater., 2011, vol. 10, pp. 434-438.
Reece, et al., Wireless Solar Water Splitting Using Silicon-Based Semiconductors and Earth-Abundant Catalysts, Science, 2011, vol. 334, pp. 645-648.
Gordon, et al., "Metal Stocks and Sustainability", Proc. Natl. Acad.. Sci., 2006, vol. 103, No. 5, pp. 1209-1214.
Baffert, et al., "Cobaloximes as Functional Models for Hydrogenases. 2. Proton Electroreduction Catalyzed by Difluoroborylbis (dimethylglyoximato)cobalt(II) Complexes in Organic Media", Inorg. Chem., 2007, vol. 46, No. 5, pp. 1817-1824.
Jacques, et al., "Cobalt and nickel-diimine-dioxime complexes as molecular electrocatalysts for hydrogen evolution with low overvoltages", Proc. Natl. Acad. Sci, 2009, vol. 106, No. 49, pp. 20627-20632.
Dempsey, et al., "Mechanism of H2 Evolution from a Photogenerated Hydridocobaloxime", J. Am. Chem. Soc., 2010, vol. 132, pp. 16774-16776.
Fourmond, et al., "H2 Evolution and Molecular Electrocatalysts: Determination of Overpotentials and Effect of Homoconjugation", Inorg. Chem., 2010, vol. 49, No. 22, pp. 10338-10347.
Pantani, et al., "Electroactivity of cobalt and nickel glyoximes with regard to the electro-reduction of protons into molecular hydrogen in acidic media", Electrochem. Commun., 2007, vol. 9, pp. 54-58.
McCrory, et al., "Electrocatalytic Hydrogen Evolution in Acidic Water with Molecular Cobalt Tetraazamacrocycles", J. Am. Chem. Soc., 2012, vol. 134, pp. 3164-3170.
Anxolabehere-Mallart, et al., "Boron-Capped Tris(glyoximato) Cobalt Clathrochelate as a Precursor for the Electrodeposition of Nanoparticles Catalyzing H2 Evolution in Water", J. Am. Chem. Soc., 2012, vol. 134, pp. 6104-6107.
Kraeutler et al., "Heterogeneous Photocatalytic Preparation of Supported Catalysts. Photodeposition of Platinum on TiO2 Powder and Other Substrates", J. Am. Chem. Soc., 1978, vol. 100, pp. 4317-4318.
Zhong, et al., "Photo-assisted electrodeposition of cobalt-phosphate (Co—Pi) catalyst on hematite photoanodes for solar water oxidation", Energy Environ. Sci., 2011, vol. 4, pp. 1759-1764.
Soto et al., "Electrochemical Nucleation of Cobalt Onto Glassy Carbon Electrode From Ammonium Chloride Solutions", Electrochimica Acta, 1996, vol. 41, No. 16, pp. 2647-2655.
Cui, et al., "Electrodeposition of Cobalt from Aqueous Chloride Solutions", Journal of the Electrochemical Society, 1990, vol. 137, No. 11, pp. 3418-3423.

(56) References Cited

OTHER PUBLICATIONS

Bakac, et al., "Unimolecular and Bimolecular Homolytic Reactions of Organochromium and Organocobalt Complexes, Kinetics and Equilibria", J. Am. Chem. Soc., 1984, vol. 106, No. 18, pp. 5197-5202.

Sanchez, et al., "ZnO Buffer Layers and Nanowires Electrodeposition for Extremely Thin Absorber Solar Cells", ECS Trans., 2011, vol. 33, No. 17, pp. 183-190.

Wagner, et al., "Empirical Atomic Sensitivity Factors for Quantitative Analysis by Electron Spectroscopoy for Chemical Analysis", Surf. Interface Anal., 1981, vol. 3, No. 5, pp. 211-225.

Monk, "Reductive ion insertion into thin-film indium tin oxide (ITO) in aqueous acidic solutions: the effect of leaching of indium from the ITO", Journal of Materials Science—Materials in Electronics, 1999, vol. 10, 101-107.

Senthilkumar, et al., "Electrochemical instability of indium tin oxide (ITO) glass in acidic pH range during cathodic polarization", Mater. Chem., 2008, vol. 108, pp. 403-407.

Sun, et al., "Molecular Cobalt Pentapyriding Catalysts for Generating Hydrogen from Water", J. Am. Chem. Soc., 2011, vol. 133, pp. 9212-9215.

Hu, et al., "Comparison of $AlPO_4$- and $Co_3(PO_4)_2$- coated $LiNi0.8Co0.2O2$ cathode materials for Li-ion battery", Electrochim, Acta, 2008, vol. 53, pp. 2567-2573.

Yang, et al., "Synthesis and Characterization of Cobalt Hydroxide, Cobalt Oxyhydroxide, and Cobalt Oxide Nanodiscs", The Journal of Physical Chemistry, 2009, vol. 114, pp. 111-119.

Young, et al., "Direct formation of a water oxidation catalyst from thin-film cobalt", Energy Environ. Sci., 2010, vol. 3, pp. 1726-1728.

Steinmiller, et al., "Photochemical deposition of cobalt-based oxygen evolving catalyst on a semiconductor photoanode for solar oxygen production"., Proc. Natl. Acad. Sci., 2009, vol. 106, No. 49, pp. 20633-20636.

Miles, "Evaluation of Electrocatalysts for Water Electrolysis in Alkaline Solutions", Electroanal Chem., 1975, vol. 60, pp. 89-96.

Saioa Cobo et al.; "A Janus Cobalt-based Catalytic Material for Electro-Splitting of Water"; Nature Materials; Advance Online Publication; 2012; pp. 1-6.

Saioa Cobo et al.; "Supplementary Information for A Janus Cobalt-based Catalytic Material for Electro-Splitting of Water"; pp. 1-12.

\* cited by examiner

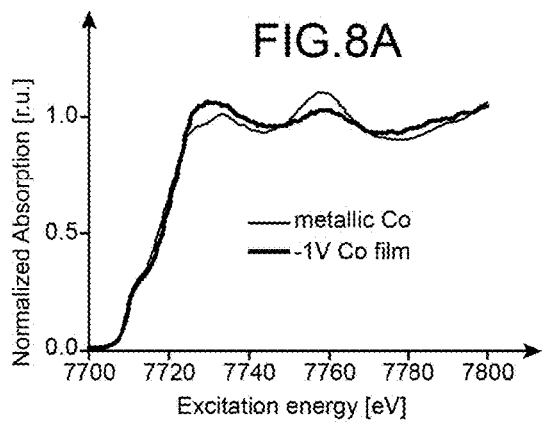
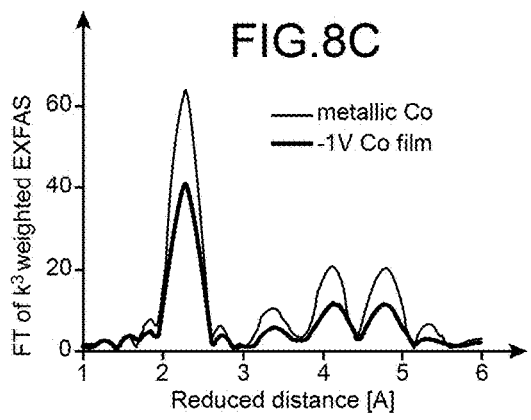
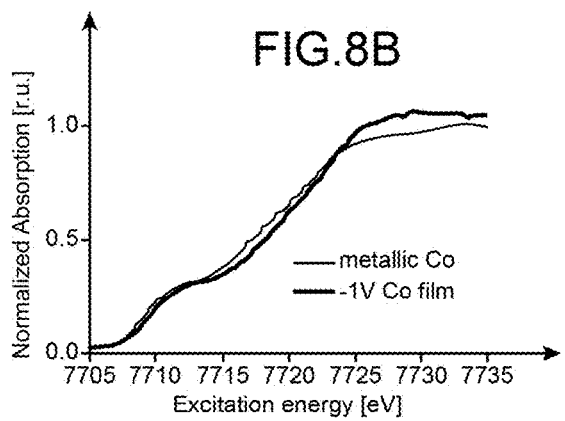
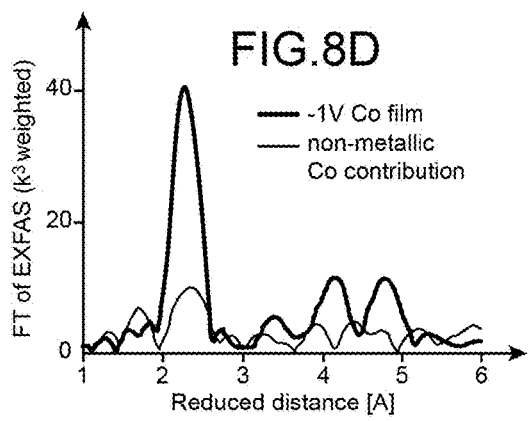
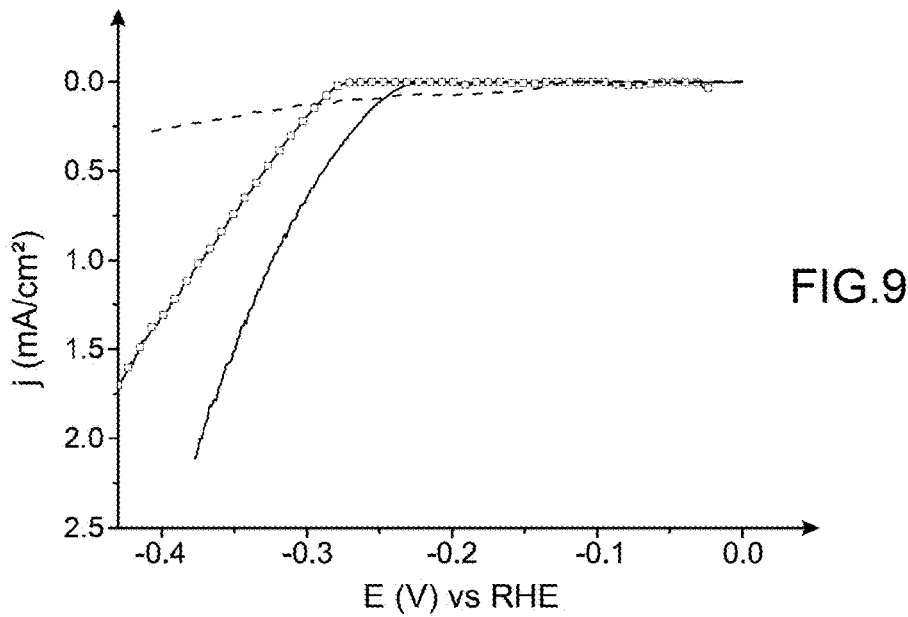

METHOD FOR PREPARING A CATALYST MEDIATING H$_2$ EVOLUTION, SAID CATALYST AND USES THEREOF

TECHNICAL FIELD

The present invention belongs to the field of the renewable energy sources and, more particularly, to the field of catalysts mediating hydrogen (H$_2$) evolution.

Indeed, the present invention is directed to methods for preparing material useful for the electrocatalytic production of H$_2$, said material and uses thereof for the production of electrodes in the field of electronics, and notably electrodes for electrolysers and photoelectrochemical (PEC) devices.

STATE OF THE PRIOR ART

Exploitation of abundant but intermittent and diluted renewable energy sources, such as sunlight or wind [1], requires efficient energy storage technologies. The cost-effective conversion of these energy sources into a chemical form via the production of a fuel is one of the greatest challenges of the century.

Molecular hydrogen is widely considered as a convenient energy vector. Its combustion in a fuel cell generates electricity with high yield and without any pollutant exhaust, water being the sole reaction product. However although hydrogen is one of the most abundant elements on the Earth, molecular H$_2$ exists only as traces in the atmosphere and should thus be produced through processes that require an energy input. Thus one major point concerns the economically viable production of H$_2$ from renewable sources, namely sunlight and water.

In that context the photoelectrochemical (PEC) technology appears promising. It consists in combining a photoactive element (semiconductor or molecular photosensitizer) with catalysts in an integrated configuration.

Reduction of protons to H$_2$ is apparently a very simple reaction, unfortunately slow on most electrodes. Hence hydrogen evolution is generally not observed at potentials near equilibrium (−413 mV vs. SHE for "Standard Hydrogen Electrode" at pH 7 in water) but requires the application of an overpotential also called activation potential. The same occurs for H$_2$ oxidation. This kinetic limitation thus significantly reduces the energetic yield during a complete formation/uptake cycle of H$_2$ and is therefore economically limiting for most industrial applications. The use of catalysts reduces the activation potential and thus increases the efficiency of the devices.

While important reports have been made recently regarding the use of cobalt [2-4], nickel [5] and manganese oxide [6,7] materials as robust electrocatalysts for water oxidation (OER), few such materials exist for hydrogen evolution (HER) [8-11].

In addition, when metallic electrode materials based on Co, Ni or Fe, their alloys and their oxides are used as catalyst for H$_2$ evolution, they are employed under strongly alkaline conditions, alkaline electrolysis being a mature technology for H$_2$ production. However such conditions are not compatible with the stability of most substrates, semiconductors and organic materials that must be used in the context of an integrated photoelectrochemical device [11].

Currently, noble metals such as platinum and iridium, currently used in Proton Exchange Membrane (PEM) electrolysers, can work under acidic to neutral conditions only compatible with the stability of the above mentioned photoactive elements. Even if platinum is a very efficient catalyst and enables high currents to be produced in the fuel cell, its cost is high and platinum is of limited availability. Therefore the metal catalyst is a significant contributor to the cost of the H$_2$-producing device. A further difficulty is that platinum is available in limited quantities on earth and world supplies cannot be expected to last more than a few decades if the use of devices for H$_2$ production and utilization was to be generalized, fuel-cells in cars notably [12].

The viability of a H$_2$ economy thus depends on the design of efficient systems based on earth-abundant elements.

Alternatives to platinum catalysts have been the object of numerous studies: one possibility is the use of hydrogenase enzymes at the anode. Electrodes based on the combination of hydrogenase enzymes with a carbon material have already been disclosed. However, hydrogenases have been found to be highly sensitive to the presence of oxygen, and become inactive over a period of time when used in a standard fuel cell operating with oxygen (or an oxygen containing material such as air) as the oxidant. Moreover, they are very difficult to produce in a catalytically active form in significant amounts. A representative preparation requires two weeks for a few milligrams of enzymes corresponding to a few amount of active molecule since the molecular weight of the catalyst is about 55 kg·mol$^{-1}$.

Innovative breakthroughs based on cobalt compounds appeared in the past decade [13] for electrocatalytic HER [2-4]. The inventors and others [14-16] namely reported that a series of cobaloxime and diimine-dioxime [15] compounds display remarkable properties for proton reduction with low overpotential requirements [17]. However, practical utilization of molecular catalysts requires their grafting with retention of the catalytic activity onto an electrode material [9,18], which in the specific case of Co catalysts has so far been prevented by synthetic issues [13]. In addition, these metal complexes are disclosed to be stable in aqueous conditions [18-21]. On the other hand, these metal complexes can produce metal cobalt particles but this production is carried out in acetonitrile with a very strong acid [22].

There is a real need for a direct and smoother method for the preparation of very stable, noble metal-free, electrocatalytic materials for H$_2$ evolution and, in particular, for electrocatalytic materials for H$_2$ evolution from neutral aqueous buffer at modest overpotentials.

DISCUSSION OF THE INVENTION

The present invention recorded by the inventors makes it possible to solve the above-identified technical problem and some drawbacks of the prior art methods and catalysts.

Indeed, the inventors have found that a robust nanoparticulate electrocatalytic material can be prepared electrochemically, photochemically or photoelectrochemically from solutions, such as aqueous solutions, containing cobalt or nickel organic complexes in a phosphate buffer. This material mediates H$_2$ evolution from neutral aqueous buffer at modest overpotentials. The catalyst thus prepared consists of metallic cobalt (or nickel) coated with a cobalt (or nickel) oxo/hydroxo-phosphate layer in contact with the electrolyte. Upon potential switch to anodic conditions, this H$_2$-evolving material reversibly transforms into the amorphous O$_2$-evolving cobalt (or nickel)-oxide film initially described by Kanan and Nocera [2,5].

First of all, it must be emphasized that such a result can be obtained not only with phosphate but also with different other basic oxoanions. On the other hand, coatings are also observed with iron (Fe), manganese (Mn) or copper (Cu) instead of cobalt or nickel but without H$_2$ evolution.

Then, surprisingly, the inventors have found that molecular cobalt or nickel complexes are not stable in the particular conditions carried out (i.e. both the solution conditions and the reductive potential used) and that they can be used to prepare interesting catalysts, while prior art teaches to the one skilled in the art how stable these complexes are in aqueous solution [19,21].

In addition, using cobalt or nickel organic complexes, instead of cobalt or nickel salts, makes it possible to obtain a fine and precisely deposited catalytic nanoparticulate material.

More particularly, the present invention concerns a method for the preparation of a catalyst onto a solid support of a (semi-)conductive material consisting in depositing said catalyst onto said support from a near-neutral aqueous solution containing at least one nickel or cobalt organic complex and at least one basic oxoanion, by a method selected in the group consisting of reductive electrodeposition, photochemical electrodeposition and photoelectrochemical deposition.

In the method of the present invention, the catalyst material is prepared onto a solid support which can present different shapes and sizes, according to the device in which it is or will be used. Advantageously, this solid support has a shape selected in the group consisting of a plaque, a rod, a cylinder and a wire.

This solid support is a support of a semiconductive material, of conductive material or of a material presenting semiconductive areas and/or conductive areas.

In a particular embodiment, the solid support advantageously is a conductive or semiconductive material with a high specific surface. It may be nano-structured or not. This conductive or semiconductive material with a high specific surface may be deposited on another support of a conductive material, in order to form an electrode with a high specific surface. This other conductive material may be made of any conducting material, for example fluorine-doped tin oxide (FTO), indium tin oxide (ITO), aluminium-doped zinc oxide (AZO), stainless steel, iron, copper, nickel, cobalt, aluminium (in particular when it is freshly brushed), gold, doped-diamond, titanium, brass or carbon, such as graphite.

Within the context of the present invention, the term "semiconductor" or the expression "semiconductive material" is understood to mean an organic or inorganic material that has an electrical conductivity intermediate between metals and insulators. The conductivity properties of a semiconductor are mainly influenced by the charge carriers (electrons or holes) that the semiconductor has. These properties are determined by two particular energy bands known as the valence band (corresponding to the electrons involved in covalent bonds) and the conduction band (corresponding to electrons in an excited state and that are capable of moving within the semiconductor). The "band gap" represents the energy difference between the valence band and the conduction band. The band gap generally does not exceed 3.5 eV for semiconductors, versus 5 eV in materials considered to be insulators. A semiconductor also corresponds, unlike insulators or metals, to a material for which the electrical conductivity can be controlled, to a large extent, by addition of dopants which correspond to foreign elements inserted into the crystal structure of the semiconductor.

Advantageously, the material of the solid support implemented in the present invention can be selected from the group consisting of a metallic material, a carbon material, a semiconductor or conductor metal oxide, nitride and chalcogenide.

Non-limitative examples of metallic material which can be used as material for the solid support implemented in the present invention are silicon, brass, stainless steel, iron, copper, nickel, cobalt, aluminium (in particular when it is freshly brushed), silver, gold and titanium.

Non-limitative examples of carbon material which can be used as material for the solid support implemented in the present invention are a curved carbon nanostructure like carbon black, single or multi-walled carbon nanotubes (CNT), fullerenic nanoparticles; graphite; glassy carbon (expanded or not, or a foam); graphene; reduced graphene oxide and doped diamond. Additional information on these particular carbon materials and their preparation can be found in the international application WO 2010/046774 [18].

Non-limitative examples of semiconductor or conductor metal oxide, nitride or chalcogenide which can be used as material for the solid support implemented in the present invention are $TiO_2$, NiO, ZnO, $ZrO_2$ ITO, $SnO_2$, $WO_3$, $Fe_2O_3$, $BiVO_4$, $Ta_2O_5$, $Ta_3N_5$, TaON, ZnS, ZnSe, CdS, CdSe, CdTe, ZnTe and composites of these materials, also possibly doped with other elements such as fluorine to give, for example, fluorine-doped tin oxide (FTO).

The near-neutral aqueous solution implemented in the method according to the present invention is a solution, the pH of which is comprised between 5 and 9; advantageously between 6 and 8; notably between 6.3 and 7.7; in particular, between 6.5 and 7.5 and, more particularly, between 6.7 and 7.3. Advantageously, the pH of this solution is 7.

The solvent of the near-neutral aqueous solution implemented in the method according to the present invention is any aqueous solvent known by the one skilled to be usable in solutions carried out for electrodeposition, photochemical electrodeposition and photoelectrochemical deposition.

Within the context of the present invention, the expression "aqueous solvent" is understood to mean water or a mixture of water and water-miscible solvent. Water in the context of the present invention must be understood as water, sea water, river water, spring water, deionised water or distilled water.

A "water-miscible solvent" is a solvent which forms a stable and homogeneous mixture, when mixed with water. Advantageously, said water-miscible solvent is chosen from the group consisting of acetone, methanol, ethanol, n-propanol, isopropanol, n-butanol, acetonitrile, tetrahydrofurane, dimethylformamide, dimethylsulfoxide, propylene carbonate or any mixture thereof. More particularly, the near-neutral aqueous solution is an aqueous solution the pH of which is 7.

The near-neutral aqueous solution implemented in the method according to the present invention contains at least one cobalt or nickel organic complex. A mixture of different cobalt organic complexes or a mixture of different nickel organic complexes can also be used. Moreover, a mixture of at least one cobalt organic complex and at least one nickel organic complex can also be used.

In the present invention, the expressions "cobalt or nickel organic complex", "organic cobalt or nickel complex", "cobalt or nickel molecular complex", "molecular cobalt or nickel complex" and "cobalt or nickel coordination complex" are equivalent and can be used interchangeably.

In the present invention, cobalt or nickel organic complex comprises a metal chosen from cobalt and nickel and an organic component. The organic component of the cobalt or nickel organic complex presents cyclic, heterocyclic, aromatic or heteroaromatic carbon structures, possibly mono- or polysubstituted, constituted by one or more cycle(s) or heterocycle(s) and/or one or more aromatic or heteroaromatic cycles each comprising 3 to 12 atoms, notably 4 to 8 atoms and, in particular, 5 or 6 atoms. The heteroatom(s), when present in the organic component, is(are) advantageously selected from N, O, P B and S. The substituent(s) can also contain one or more heteroatoms, such as N, O, F, Cl, P, Si, Br or S.

More precisely, the cobalt or nickel organic complex can be mono- or polynuclear and contain either monodentate or chelating, multidentate ligands.

Any metal-organic complex known by the one skilled in the art can be used in the present invention, provided that the metal in the chosen metal-organic complex is nickel or cobalt or has been replaced by nickel or cobalt. Such a complex should be able to degrade in the conditions carried out in the present invention. In other words, this complex should present a redox transition in the potential range implemented and/or a limited stability.

More particularly, the cobalt or nickel organic complex implemented in the method of the present invention is selected from the group consisting of cobalt or nickel dioxime/diimine complex; and cobalt or nickel amine/imine/pyridine complex. Among the cobalt or nickel dioxime/diimine complexes which can be used in the present invention, those having the following formulae can be cited:

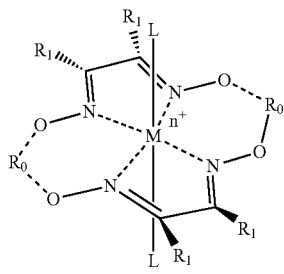

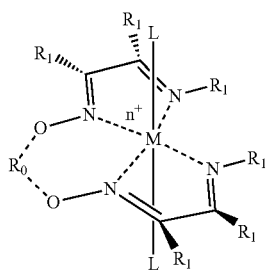

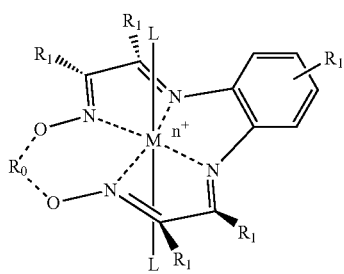

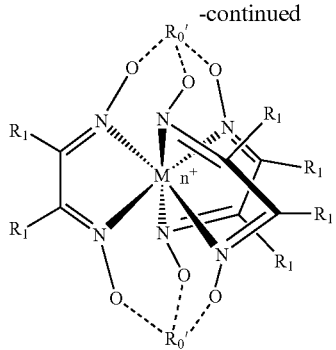

-continued wherein
M represents Ni or Co;
n is a whole number comprised between 0 and 6 and, notably is 2 or 3;
$R_0$, identical or different, represents a group selected from H, $BF_2$, $BPh_2$, $B(R_1)_2$, $B(OR_1)_2$, $BFR_1$;
$R_0'$, identical or different, represents a group selected from H, BF, BPh, $B(R_1)$, $B(OR_1)$;
L is selected from a solvent molecule such as water, acetone, methanol, ethanol, n-propanol, isopropanol, n-butanol, acetonitrile, tetrahydrofurane, dimethylformamide, dimethylsulfoxide, pyridine, an anionic ligand such as a halogen, a pseudohalogen such as SCN— or cyanide, hydride, oxygenated anion such as nitrate, sulphate, sulfonate, perchlorate, a common monodentate ligand such as pyridine, imidazole, triazole, CO, $H_2$, formyl, phosphine, nitrile or isonitrile ligands, such as acetonitrile, benzonitrile, trimethyl isonitrile, benzylisonitrile; and
$R_1$, identical or different, represents a group selected from Cl, Br, I, F, H, $C_1$-$C_{20}$ alkyl, $C_1$-$C_{20}$ alkenyl, $C_1$-$C_{20}$ alkynyl, $C_6$-$C_{30}$ aryl, $C_6$-$C_{30}$ aralkyl, possibly comprising one or more functions selected from —OH, —$NH_2$, —COOH, —$CONH_2$, a triazole ring, possibly comprising one or more bridges selected from —CO—O—CO—, —CO—NH—CO—, two or more $R_1$ substituents can optionally be fused together.

Among the cobalt or nickel amine/imine/pyridine complexes which can be used in the present invention, those having the following formulae can be cited:

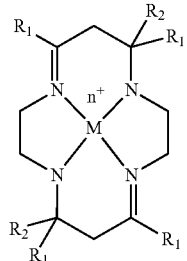 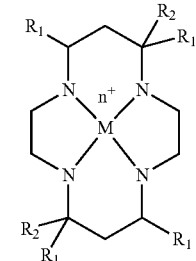

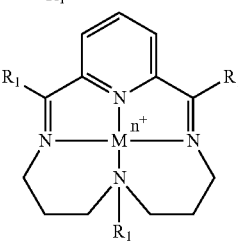 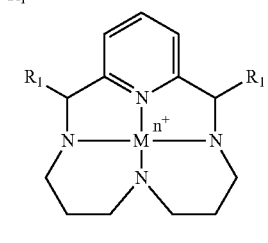

-continued

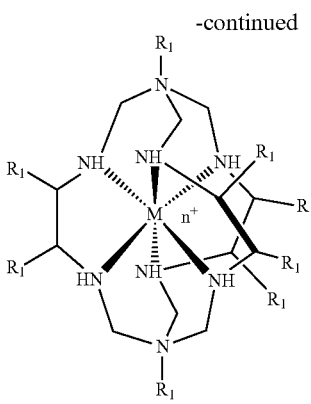

wherein

M represents Ni or Co;

n is a whole number comprised between 0 and 6 and, notably is 2, 3, 4 or 5; and $R_1$ and $R_2$, identical or different, represent a group selected from H, $C_1$-$C_{20}$ alkyl, $C_1$-$C_{20}$ alkenyl, $C_1$-$C_{20}$ alkynyl, $C_6$-$C_{30}$ aryl, $C_6$-$C_{30}$ aralkyl, possibly comprising one or more functions selected from —OH, —$NH_2$, —COOH, —$CONH_2$, a triazole ring, possibly comprising one or more bridges selected from —CO—O—CO—, —CO—NH—CO—, two or more $R_1$ substituents can optionally be fused together and/or two or more $R_2$ substituents can optionally be fused together.

The expression "$R_1$ and $R_2$, identical or different" means that, in a cobalt or nickel amine/imine/pyridine complex, the $R_1$ groups can be identical or different, the $R_2$ groups can be identical or different and the $R_1$ groups and the $R_2$ groups can be identical or different.

Particular and non-limiting examples of cobalt or nickel organic complexes which can be implemented in the method according to the present invention are [Co(DO)(DOH)p-nCl$_2$] with (DOH)(DOH)pn representing $N^2,N^{2'}$-propanediylbis(2,3-butandione 2-imine 3-oxime); [Co(DO)(DOH)p-nBr$_2$]; [Co((DO)$_2$BF$_2$)pnBr$_2$] with (DO)$_2$BF$_2$)pn representing $N^2,N^{2'}$-propanediylbis(2,3-butandione 2-imine 3-oximato)-$N^1,N^{1'}$-difluoroboryl; [Co(MO)(MOH)pnCl$_2$] with (MOH)(MOH)pn representing $N^2,N^{2'}$-propanediylbis (1,2-propandione 2-imine 1-oxime); [Ni((DO)$_2$BF$_2$)pn] (ClO$_4$); [Co(dmgBF$_2$)$_2$(H$_2$O)$_2$] with dmgH$_2$ representing dimethylglyoxime (in other words, dmg$^{2-}$ representing dimethylglyoximato dianion); [Co(dmgH)$_2$pyCl]; [Co(dmgH)$_2$ (OH$_2$)$_2$]; [Co(dmgBF$_2$)$_2$(DMF)$_2$]; [Co(dmgBF$_2$)$_2$(CH$_3$ CN)$_2$]; [Co(dpgBF$_2$)$_2$(H$_2$O)$_2$] with dpgH$_2$ representing diphenylglyoxime (in other words, dpg$^{2-}$ representing diphenylglyoximato dianion); [Co(dpgBF$_2$)$_2$(DMF)$_2$]; [Co (dpgBF$_2$)$_2$(CH$_3$CN)$_2$]; [Ni(dmgBF$_2$)$_2$]; [Ni(dmgH)$_2$][Ni (DO)(DOH)pn](ClO$_4$); [Ni(MO)(MOH)pnCl]; [Ni((DO)$_2$ BF$_2$)pn](ClO$_4$); [Co(DO)(DOH)pnBr(PPh$_3$)]; [Co(DO) (DOH)pn(PPh$_3$)]; [Co(dmg)$_3$(BF$_2$)$_2$]$^+$; [Co(dpg)$_3$(BF$_2$)$_2$]$^+$; [Co(dmg)$_3$(BPh)$_2$]$^{0/1+}$; [Co(dpg)$_3$(BPh)$_2$]$^{0/1+}$. Additional information on the structure and the preparation method of these complexes can be found in [15].

The cobalt or nickel organic complex(es) is(are) present in the near-neutral aqueous solution at a molarity comprised between 1 µM and 50 mM; notably, between 0.01 mM and 5 mM; in particular, between 0.02 mM and 2 mM and, more particularly, between 0.05 mM and 1 mM. The above molarity concerns cobalt organic complex(es), nickel organic complex(es) and mixture of nickel organic complex (es) and cobalt organic complex(es). Advantageously, cobalt or nickel organic complex(es) in small concentrations make(s) it possible to better control the nanoparticle deposition. The cobalt or nickel organic complex(es) is(are) present in the near-neutral aqueous solution in dispersed form, in dissolved form and/or in suspended form.

The near-neutral aqueous solution implemented in the method according to the present invention also contains at least one basic oxoanion. A mixture of identical or different basic oxoanions can also be used in the present invention.

Basic oxoanion means in the present invention a chemical compound which comprises the generic formula $A_xO_y^{z-}$ where A represents a chemical element or a mixture of different chemical elements; O represents an oxygen atom; x represents a whole number comprised between 1 and 10 and, notably, 1 or 2; y represents a whole number comprised between 1 and 10 and, notably, 1, 2, 3 or 4; and z represents a whole number comprised between 1 and 10 and, notably, 1, 2, 3 or 4, said chemical compound presenting a pKa greater than or equal to 6. The one skilled in the art knows that pKa is the acid dissociation constant, also known as acidity constant, or acid-ionization constant, at a logarithmic scale and knows how to determine such a pKa for a particular compound. A particular example of oxoanion into which A represents a mixture of different chemical elements is a polyoxoanion of formula $B_rC_uO_v^{w-}$ where B and C represent different chemical elements; O represents an oxygen atom; r represents a whole number comprised between 1 and 10 and, notably, 1 or 2; u represents a whole number comprised between 1 and 50 and, notably, between 6 and 20; v represents a whole number comprised between 1 and 200 and, notably, between 20 and 65; and w represents a whole number comprised between 1 and 20 and, notably, 1, 2, 3, 4 or 5. The polyanions may also exist under distinct protonated forms.

Any basic oxoanion known by the one skilled in the art can be used in the method of the present invention. Advantageously, said basic oxoanion is selected from the group consisting of a phosphate, carbonate, arsenate, borate, vanadate, chromate, phosphonate, phosphite, nitrate, nitrite, sulphate, sulphonate, molybdate and tungstate. In the near-neutral solution, the basic oxoanion can be present under different forms. For example, for phosphate, this latter can be present as $HPO_4^{2-}$, $H_2PO_4^{2-}$ or $PO_4^{3-}$.

Advantageously, the basic oxoanion(s) is(are) provided in the near-neutral aqueous solution as an anionic compound comprising the basic oxoanion(s) and counter cation(s). The counter cation may be any cationic species, for example $H^+$, $NR_4^+$ with R, identical or different, representing H or a carbon group and a metal ion such as $K^+$, $Na^+$, $Li^+$, $Mg^{+2}$, $Ca^{+2}$ or $Sr^{+2}$.

The basic oxoanion(s) is(are) present in the near-neutral aqueous solution at a molarity comprised between 10 mM and 5 M, notably between 20 mM and 2 M and, particularly, between 50 mM and 1 M.

More particularly, the method for the preparation of a catalyst onto a solid support of a (semi-)conductive material according to the present invention consists in:

a) putting the solid support of a (semi-)conductive material, notably as previously defined, into contact with a near-neutral aqueous solution, notably as previously defined, containing at least one cobalt or nickel organic complex, notably as previously defined, and at least one basic oxoanion, notably as previously defined;

b) applying the appropriate conditions permitting a catalyst to be reductively electrodeposited, to be photochemically electrodeposited or to be photoelectrochemically deposited onto said solid support of a (semi-)conductive material.

Any protocol usable to put the solid support of a (semi-)conductive material into contact with the near-neutral solution can be used in the context of the present invention. As for non-limiting examples, step (a) of the method according to the present invention can be carried out by dipping or by submerging the solid support in the near-neutral solution, by applying a film of the near-neutral solution on the surface of the solid support or by flowing or pumping the near-neutral solution onto the solid support. Clearly, regardless of the method used in step (a), an electrode must be brought into contact with the solution without touching the support for a deposit to take place when the technique of step (b) is a reductive electrodeposition or a photoelectrochemical deposition.

In a $1^{st}$ embodiment, step (b) consists in a reductive electrodeposition.

Electrodeposition is a process well-known by the one skilled in the art. The application of the catalyst coating by electrodeposition involves depositing said catalyst to an electrically (semi)conductive substrate under the influence of an applied electrical potential.

This deposition protocol is typically carried out in a three electrode cell advantageously consisting of two separated compartments separated by a glass frit. The three electrodes of the cell are (1) a working electrode which is the solid support of conductive or semiconductive material, (2) a counter electrode also known as auxiliary electrode and (3) a reference electrode. If a two compartment cell is used, the working electrode and the reference electrode are in one of the two compartments while the counter electrode is in the other compartment. The near-neutral solution as previously defined is in the compartment into which the working electrode and the reference electrode are placed. The solution in the compartment into which the counter electrode is placed can be identical or different to this latter. Advantageously, the compartment into which the counter electrode is placed is also filled with the near-neutral solution as previously defined.

Any reference electrode known by one skilled in the art can be used for the present reductive electrodeposition. Typically, this reference electrode can be selected from calomel electrode (filled with KCl or NaCl, either saturated or not), standard hydrogen electrode; normal hydrogen electrode; reversible hydrogen electrode; a silver chloride electrode (Ag/AgCl) (filled with KCl or NaCl, either saturated or not); mercury-mercurous sulphate electrode or a copper-copper(II) sulphate electrode.

Any counter electrode known by one skilled in the art can be used for the present reductive electrodeposition. Typically, this counter electrode is fabricated from electrochemically inert materials such as gold, platinum, rhodium, or carbon. As for illustrative and non-limiting examples, the counter electrode can be a platinum mesh or a platinum grid.

The electrodeposition implemented in the method of the present invention is a reductive electrodeposition. As a consequence, a negative potential is applied to the working electrode vs the reference electrode. This applied potential is preferably constant. Advantageously, the potential applied to the working electrode is below −0.4 V (for example, versus Ag/AgCl), notably below −0.6 V (for example, versus Ag/AgCl), in particular, below −0.8 V (for example, versus Ag/AgCl) and, more particularly, the applied potential is about −1 V (for example, versus Ag/AgCl), about −1 V meaning −1 V±0.1 V.

The reductive electrodeposition implemented in the method of the present invention is advantageously performed during a period of between 1 min and 10 h, notably between 2 h and 7 h and, in particular, for about 3 h (i.e. 3 h±15 min).

Figure 2A:
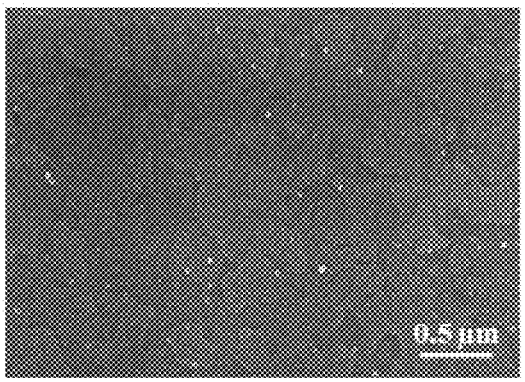

During the reductive electrodeposition in the method of the present invention, the total current implemented is comprised between 0.1 and 10 C/cm² of electrode. In the present invention, the slower the deposit is, the better its control is. For example, if a total charge of 0.1 C/cm² is passed during 1 h, the deposit thus obtained is in the form of isolated nanoparticles (FIG. 2A).

In a $2^{nd}$ embodiment, step (b) consists in a photochemical electrodeposition.

Photochemical electrodeposition is a process well-known by the one skilled in the art [23]. This particular deposition process is typically implemented with a solid support of a semiconductive material as defined in the present invention. The solid support is irradiated with electromagnetic radiation, in presence of the near-neutral solution as previously defined. Any single wavelength or broadband source of electromagnetic radiation and notably any single wavelength or broadband source of UV-light can be used to illuminate the solid support in the context of the present invention, provided that the energy (hυ of the radiation is superior to the band-gap energy ($E_g$) of the considered semi-conducting material.

In the method of the present invention, the photochemical electrodeposition of a molecular cobalt or nickel complex from a near-neutral solution as previously defined is performed onto a irradiated semiconductor with the suitable energy level of the conduction band with water oxidation, since the near-neutral solution is an aqueous solution, or optionally the oxidation of a sacrificial electron donor occurring at the valence band of the same irradiated semiconductor. In other words, the photochemical electrodeposition is formed through the reduction of the Co or Ni ions thanks to photogenerated electrons in the conduction band paralleled by water oxidation, since the near-neutral solution is an aqueous solution, or optionally the oxidation of a sacrificial electron donor by holes remaining in the valence band.

Indeed, in this alternative, the near-neutral aqueous solution can also contain at least one sacrificial electron donor which transfers numerous electrons to the irradiated semiconductor. The one skilled in the art knows different sacrificial electron donors which can be used in the present invention. As illustrative and non limiting examples of sacrificial electron donors, one can cite methanol, isopropanol and other alcohols, ascorbic acid and its salts, thiols and their salts (for example thiophenol, cysteine), $H_2S$ and its salts and sacrificial electron donor amines such as trimethylamine, triethylamine, tripropylamine, tributylamine, dimethylethanolamine, dimethyldodecylamine, pyridine, quinoleine, isoquinoline and lipdine.

Advantageously, the photochemical deposition implemented in the method of the present invention is performed during a period of between 1 min and 10 h, notably between 2 h and 7 h and, in particular, for about 3 h (i.e. 3 h±15 min).

In a $3^{rd}$ embodiment, step (b) consists in a photoelectrochemical deposition.

Photoelectrochemical deposition is a process well-known by the one skilled in the art [24]. This particular deposition process is typically implemented with a solid support of a semiconductive material as defined in the present invention.

The photoelectrochemical deposition of the catalyst on the semiconductor is accomplished in the method by using energy from two sources (light and electricity) to facilitate the deposition reaction from the electrolyte i.e. the near-neutral solution. Neither of the two energy sources alone is sufficient to facilitate the deposition on their own. The method according to this $3^{rd}$ embodiment utilizes an electromagnetic radiation source to assist in electrochemical deposition of the catalyst onto a semiconductor.

In the method of the present invention, the photoelectrochemical deposition of a molecular cobalt or nickel complex from a near-neutral solution as previously defined is performed onto a irradiated semi-conductor with the suitable energy level of the conduction band with the electrochemical setup injecting electrons in the valence band of the same irradiated semi-conductor.

In other words, the surface of the semiconductor is irradiated with electromagnetic radiation providing a photoenergy sufficient to produce an electronic excited state in the semiconductor so as to provide a portion of the energy required to deposit the catalyst from the near-neutral solution as previously defined. Nevertheless, because energy level of the valence band of the irradiated semiconductor is not suitable for oxidizing neither water from the near-neutral solution, nor any sacrificial electron donor a first electric bias is simultaneously applied to the semiconductor. The first electric bias is significantly less (in other word, the applied potential is more positive) than the bias required for electrochemical deposition ($1^{st}$ embodiment).

The photoelectrochemical deposition can be carried out in a three electrode cell consisting of one or two separated compartments as previously defined and using electromagnetic radiation sources as previously defined.

The photoelectrochemical deposition implemented in the method of the present invention is typically performed during a period of between 1 min and 10 h, notably between 2 h and 7 h and, in particular, for about 3 h (i.e. 3 h±15 min).

Once the catalyst is deposited onto the solid support of a (semi-)conductive material, it can be dried and/or washed and immediately used or stored before use.

The present invention also concerns the use of a near-neutral aqueous solution as previously defined and/or of a method selected from reductive electrodeposition, photochemical electrodeposition and photoelectrochemical deposition as previously defined, to prepare a catalyst mediating $H_2$ evolution.

The present invention also concerns a catalyst obtainable by the preparation method according to the present invention.

As presented in the hereinafter experimental part, the inventors have identified that the catalyst or catalytic material also designed by ($H_2$—Co/Ni Cat) obtained by the preparation according to the present invention has a nanoparticulate morphology with nanoparticles the average diameter of which is comprised between 5 nm and 150 nm and notably between 10 nm and 100 nm. This material consists of elemental (i.e. metallic) cobalt/nickel covered or coated by a cobalt/nickel oxo/hydroxo-/oxoanion layer (or compound) in contact with the electrolyte. The latter proves active as a catalyst material for hydrogen evolution under strictly neutral conditions. Indeed, the oxoanion(s) present in the active layer play(s) the role of a proton relay between the electrolyte and the metallic site where protons are reduced into $H_2$.

The present invention also concerns an electrode coated by a catalyst according to the present invention or obtainable by the preparation method according to the present invention.

In the present invention, the electrode can be the solid support of a (semi)conductive material as previously defined, coated by a catalyst according to the present invention or obtainable by the preparation method according to the present invention. The electrode is thus obtained once the preparation method according to the present invention has been performed.

Alternatively, the catalyst can be removed from the solid support of a (semi)conductive material, once the preparation method according to the present invention has been performed. The catalyst can be optionally dried, stored, and/or mixed with an additive such as a binder before being applied to a current collector thus generating an electrode according to the present invention.

The electrode according to the present invention can be used in electrolysers and PEC devices.

Finally, the present invention concerns the use of a catalyst according to the present invention or obtainable by the preparation method according to the present invention or an electrode according to the present invention for mediating the hydrogen evolution.

Indeed, the catalyst according to the present invention is a better catalyst than other prior art deposits for example the deposit disclosed in [21,25,26] as shown in FIG. 9. These better catalytic activity is due to the solution implemented to obtain the catalyst according to the present invention and, in particular, to the oxoanion(s) present therein which play(s) the role of proton relay as already explained.

The hydrogen evolution mediation is advantageously performed from neutral aqueous buffer at modest overpotentials. Indeed, in the present invention, the hydrogen evolution can be detected for overpotential values as low as 50 mV and overpotential values of 270 mV and 385 mV are required to reach current density values of 0.5 and 2 $mA \cdot cm^{-2}$ respectively.

Other characteristics and advantages of the present invention will additionally be apparent to the one skilled in the art on reading the examples below, which are given as an illustration and not a limitation, with reference to the attached figures.

SHORT DESCRIPTION OF THE DRAWINGS

FIG. 1 presents different linear voltammetry experiments. In plain, linear voltammetry experiment (plain) recorded at a FTO electrode (1 $cm^2$) in phosphate buffer (KPi, 0.5 M, pH 7) containing the water-soluble diimine dioxime cobalt(III) complex [Co(DO)(DOH)pnCl$_2$] with (DO)(DOH)pn representing $N^2,N^{2'}$-propanediylbis(2,3-butandione 2-imine 3-oxime) (0.1 mM) at a low scan rate (0.05 $mV \cdot s^{-1}$) with simultaneous GC monitoring of $H_2$ evolution (dotted): $N_2$ was continuously bubbled through the electrolyte at a constant flow (5 $mL \cdot min^{-1}$) during the experiment and the concentration of $H_2$ in the output gas was determined every 2 min by gas chromatography. In bold, similar experiment carried out on a FTO electrode modified by controlled potential electrolysis for 3 h at −385 mV vs RHE in the same solution and transferred into a cobalt-free buffer. The $H_2$ evolution scale on the right has been adjusted so as to correspond to the current density scale on the left with a 100% faradaic yield.

FIG. 2 presents SEM images of electrodes modified by electrolysis at (FIG. 2A) −0.9 V vs Ag/AgCl for 1 h (ITO, 0.1 $C \cdot cm^{-2}_{geometric}$) and (FIG. 2B) −1.0 V vs Ag/AgCl for 3 h (FTO, 6.5 $C \cdot cm^{-2}_{geometric}$) vs RHE in phosphate buffer (KPi, 0.5 M, pH 7) containing Co(DO)(DOH)pnCl$_2$ (0.5 mM). FIG. 2C is a SEM image of a $H_2$—CoCat film on FTO electrode formed at −1 V vs Ag/AgCl and then equilibrated at 1.16 V vs Ag/AgCl for 90 min in a cobalt-free 0.5 $mol \cdot L^{-1}$ KPi, pH 7 electrolyte, while FIG. 2D is a SEM image of $H_2$—CoCat film on FTO electrode initially equilibrated at −1 V vs Ag/AgCl and taken out of the solution just after a potential switch to 1.16 V vs Ag/AgCl before equilibration of the current.

Figure 3:
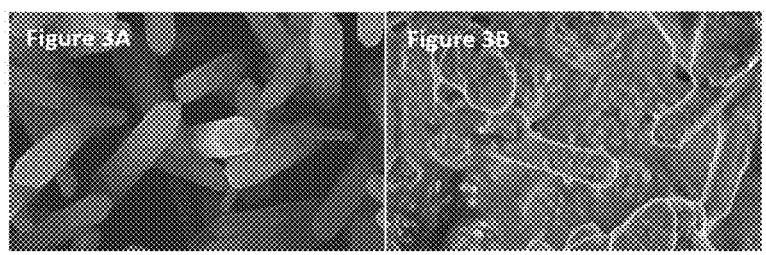

FIG. 3 presents SEM images of pristine ZnO nanorods (FIG. 3A) and of ZnO nanorods onto which $H_2$—CoCat nanoparticles are photochemically deposited for 3 h ([Co (DO)(DOH)pnCl$_2$]=0.05 mM in 0.1 M KPi, UV-light) (FIG. 3B).

Figure 4:
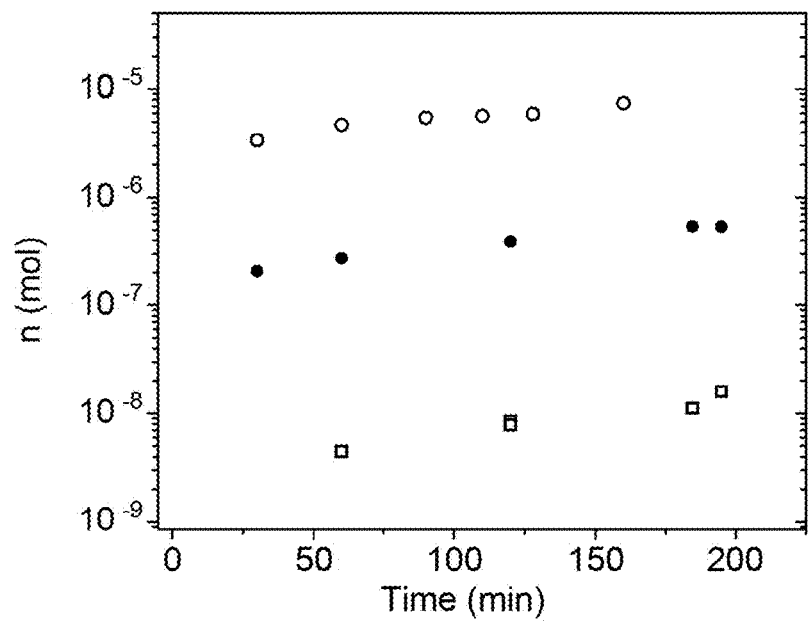

FIG. 4 presents $H_2$ and $O_2$ evolution quantified through gas chromatography during photochemical deposition in 0.1 M KPi, UV-light at [Co(DO)(DOH)pnCl$_2$]=0.05 mM ($H_2$, open squares and $O_2$, black circles) and at [Co(DO)(DOH) pnCl$_2$]=0.1 mM ($O_2$, open circles).

Figure 5A:
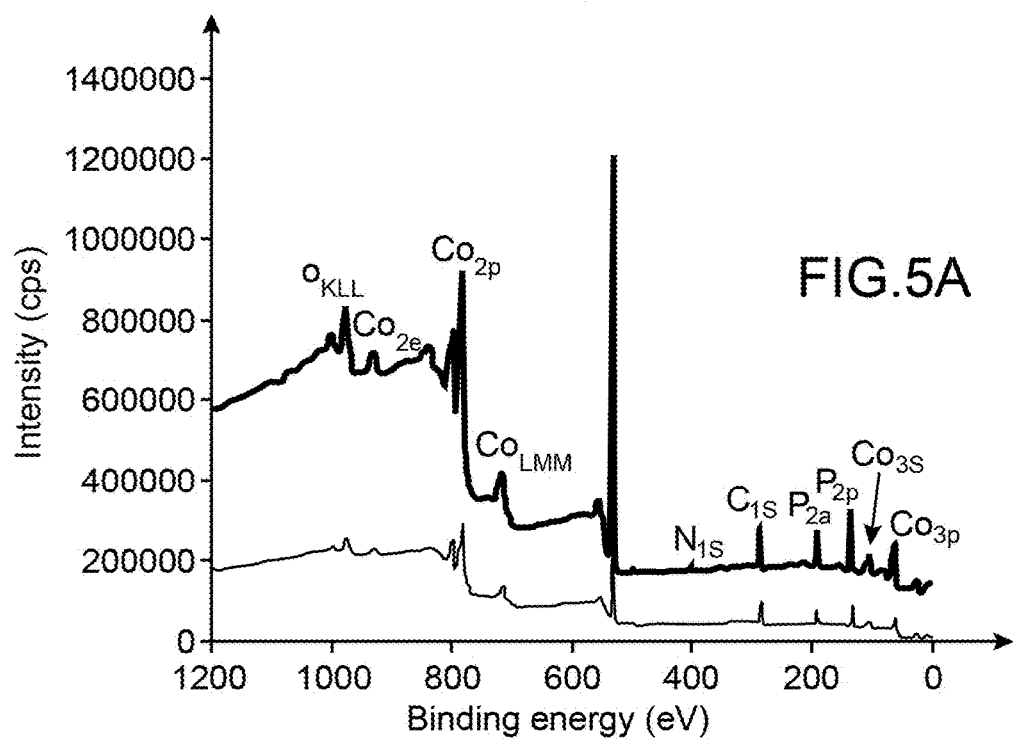
Figures 5B, 5C, 5D:
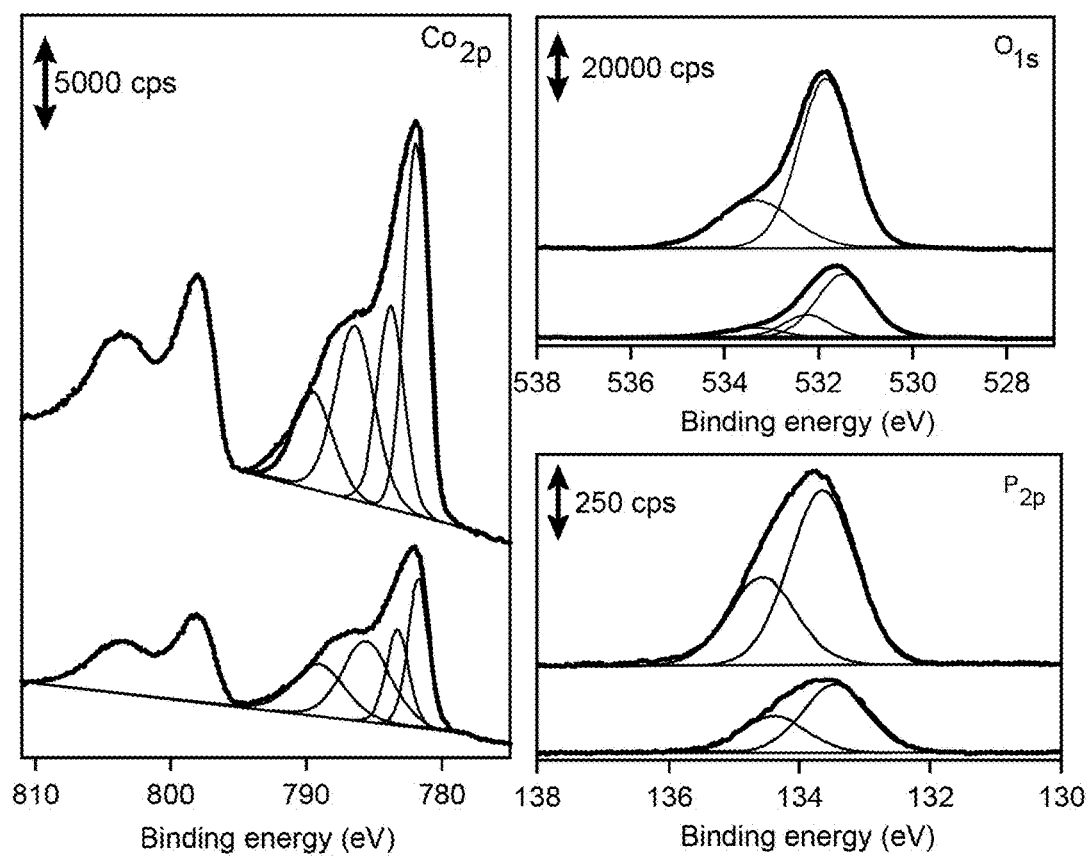

FIG. 5 presents XPS survey (FIG. 5B), $Co_{2p}$ (FIG. 5C), $O_{1s}$ (FIG. 5A) and $P_{2p}$ (FIG. 5D) core levels spectra of $H_2$—CoCat deposited on FTO substrate (bottom on all panels) and commercial $Co_3(PO_4)_2$ $xH_2O$ (top on all panels).

Figure 6A:
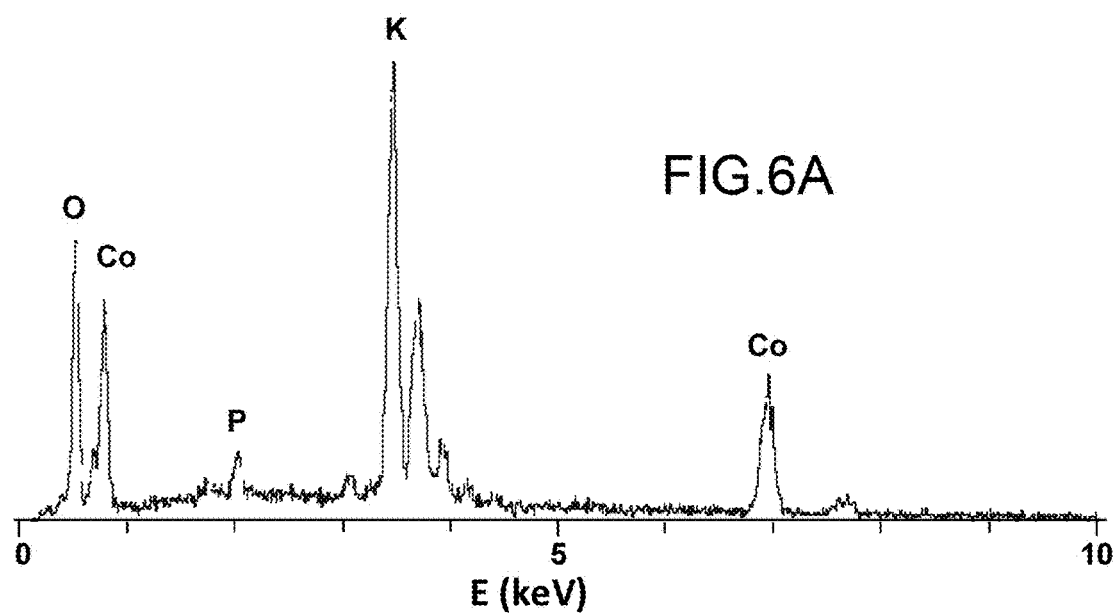
Figure 6B:
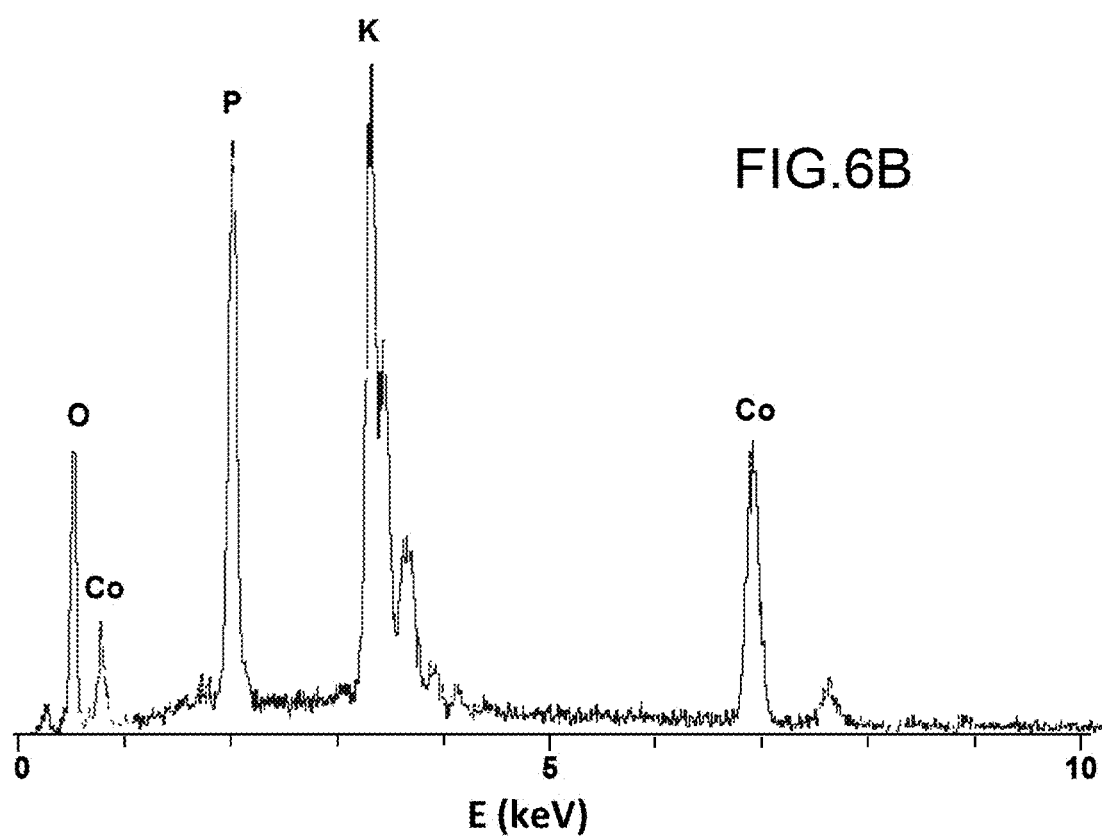

FIG. 6 presents characteristic EDX spectrum acquired at 15 kV counts per second of FTO electrodes modified by $H_2$—CoCat (FIG. 6A) and $H_2$—CoCat equilibrated for 90 min at +1.16 V vs Ag/AgCl in phosphate buffer (KPi, 0.5 M, pH 7) (FIG. 6B).

Figure 7:
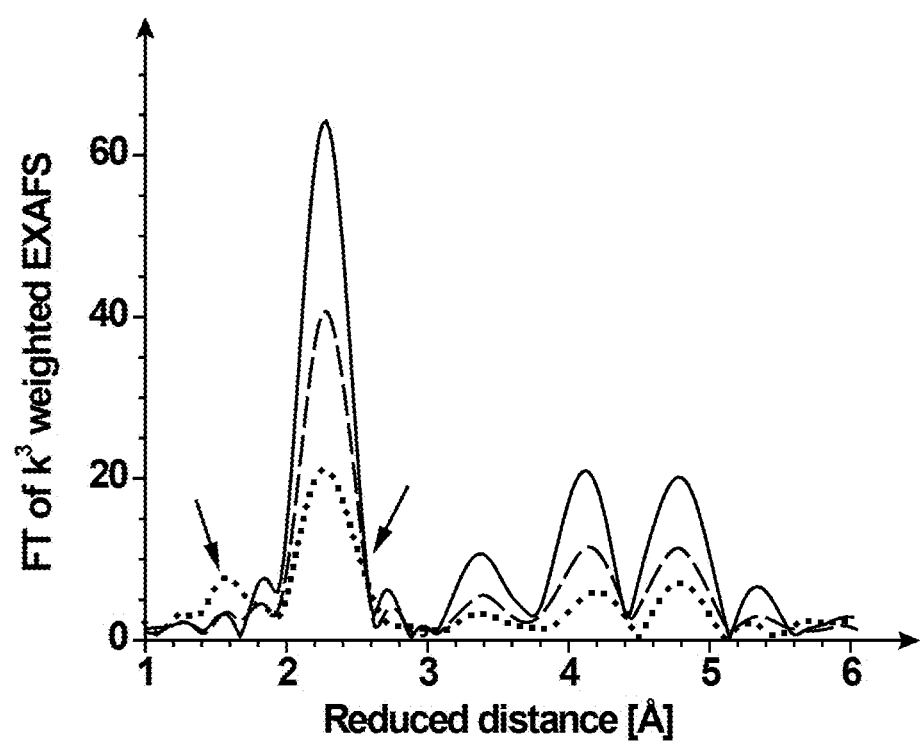

FIG. 7 presents Fourier-transformed EXAFS spectra collected at the Co K edge. Plain trace: $H_2$—CoCat equilibrated at −1.0 V vs Ag/AgCl. Dotted trace: $H_2$—CoCat equilibrated at +1.16 V vs Ag/AgCl for 4 min. Dashed trace: Co metal foil (hexagonal close-packed state). The XANES spectra of the film formed at −1.0 V vs Ag/AgCl and of metallic cobalt are shown in the inset. The arrows mark features that are assignable to the contribution (~50%, FIG. 9) of a phase of edge-sharing $CoO_6$ octahedra to the spectrum of the film equilibrated at +1.16 V vs Ag/AgCl (dotted line).

FIG. 8 presents X-ray absorption spectra of $H_2$—CoCat (bold lines) and of purely metallic $Co^0$ (plain lines). $H_2$—CoCat was electro-deposited on a glassy carbon electrode at −1.0 V (vs Ag/AgCl) for 3 h from an aqueous solution containing 0.5 M potassium phosphate (KP$_i$, pH 7) and 0.5 mM Co(DO)(DOH)pnCl$_2$, then equilibrated at −1.0 V for 4 min in a Co-free KPi solution and rapidly frozen in liquid nitrogen. In FIGS. 8A and 8B, XANES spectra; in FIGS. 8C and 8D, Fourier-transformed EXAFS spectra. The plain line in FIG. 8D was obtained by subtraction of the appropriately weighted metal spectrum from the spectrum of $H_2$—CoCat (and renormalisation of the resulting spectrum) assuming that 59% of film consisted of purely metallic cobalt. The resulting spectrum (plain line) is assignable to a non-metallic species with light atoms (O, N, C) in the first coordination sphere of cobalt. A more quantitative analysis is prevented by noise problems and the uncertainties in the used approach to correct for contributions of the metallic cobalt.

FIG. 9 presents linear voltammetry experiments recorded at a low scan rate (0.05 mV·s$^{-1}$) at a FTO electrode (1 cm$^2$) in (FIG. 9, plain, formation of $H_2$CoCat) phosphate buffer (KPi, 0.5 M, pH 7) solution containing Co(DO)(DOH)pnCl$_2$ (0.5 mM), (FIG. 9, squared) a NH$_4$Cl (1 M, pH 5) solution containing CoCl$_2$ (0.5 mM) [25] and (FIG. 9, dashed) a LiClO$_4$ (1 M, pH 5) solution containing CoCl$_2$ (0.5 mM) [26].

Figure 10:
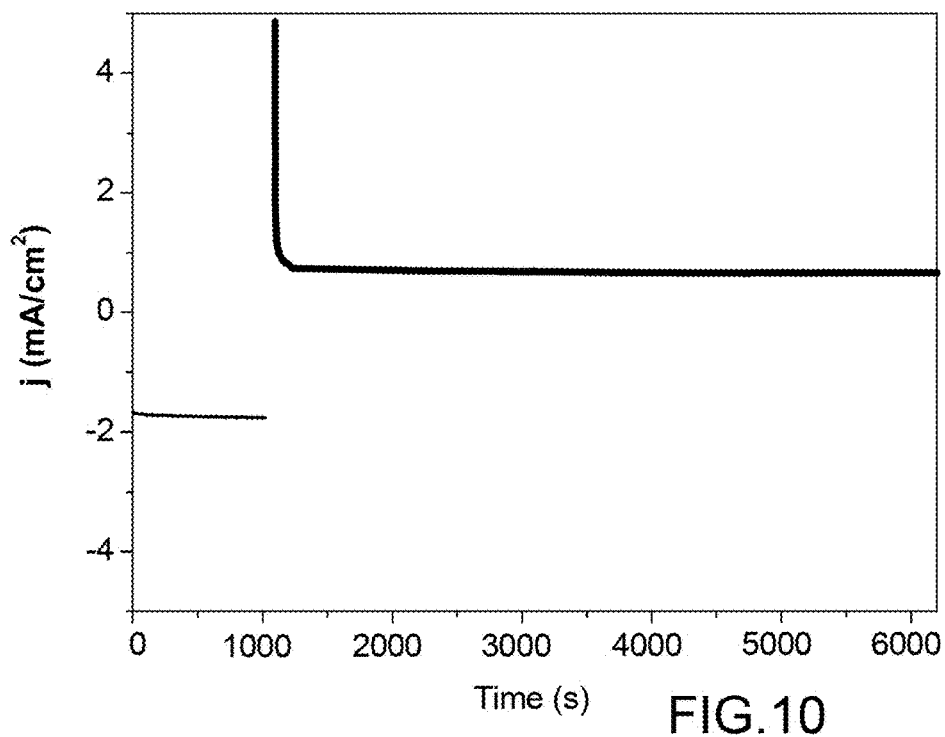

FIG. 10 presents the evolution of the current density at a FTO electrode (1 cm$^2$) coated with $H_2$—CoCat in 0.5 M KPi, pH 7 electrolyte when the potential is switched from reductive (plain line, −1 V vs Ag/AgCl) to oxidative (bold line, 1.16 V vs Ag/AgCl) conditions.

Figure 11:
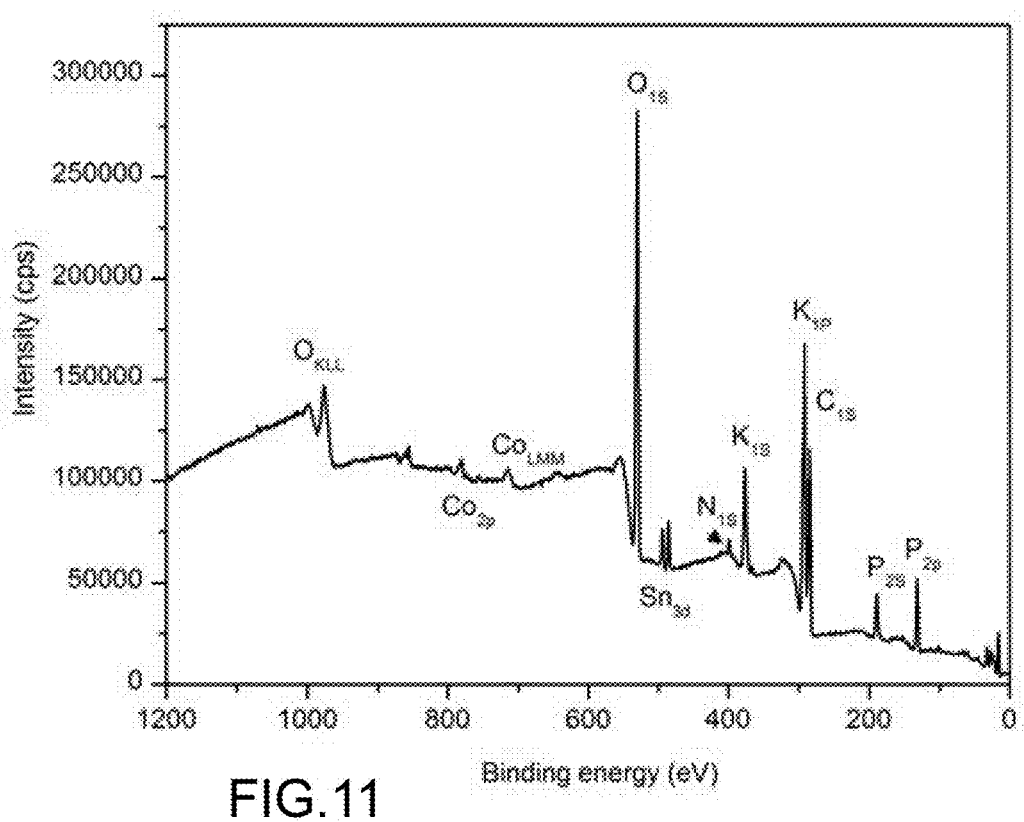

FIG. 11 presents XPS survey of $H_2$—CoCat film after anodic equilibration at +1.16 V vs Ag/AgCl for 1 h in KPi (pH 7, 0.5 M).

Figure 12A:
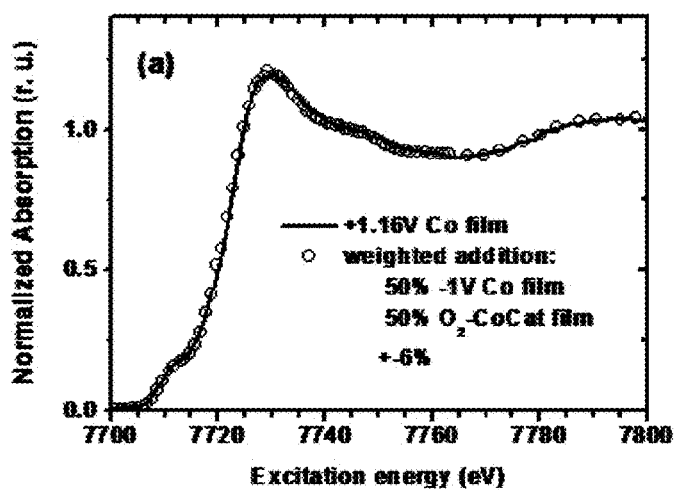
Figure 12B:
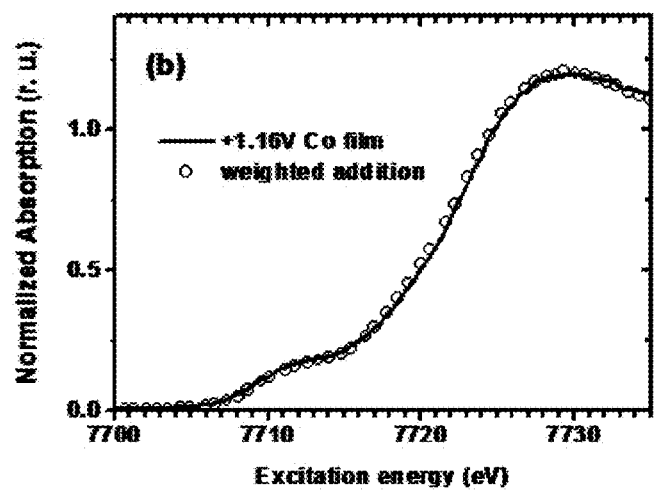
Figure 12C:
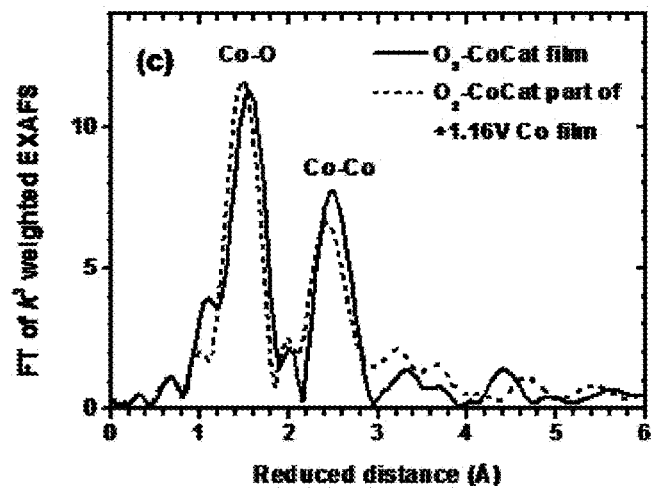

FIG. 12 presents X-ray absorption spectrum of $H_2$—CoCat formed at −1 V vs Ag/AgCl and further equilibrated at +1.16 V for 4 min (plain lines) compared to a weighted addition (circles) of spectra from the $H_2$—CoCat (FIG. 8) and "$O_2$—CoCat initially described by Kanan and Nocera [2] corresponding XAS data by Dau and coworkers" (dotted line) [3]. In FIGS. 12A and 12B, XANES spectra; in FIG. 12C, Fourier-transformed EXAFS spectra. The weighting coefficients in FIGS. 12A and 12B suggest that about 50% of the Co ions of the +1.16 V equilibrated CoCat film stay in the state present in $H_2$—CoCat before application of the positive voltage, whereas 50% of the deposit restructured resulting in the same Co oxide (consisting of clusters of edge-sharing $Co^{III}O_6$ octahedra [3]) that is obtained by electro-deposition at positive potentials. The green line in FIG. 12C was determined by the subtraction of the XANES/EXAFS spectrum of $H_2$—CoCat weighted by a factor of 0.5 from the spectrum of the +1.16 V equilibrated CoCat film. The resulting spectrum was renormalized and Fourier-transformed. It is assumed that this spectrum corresponds to the "$O_2$—CoCat" contribution of the +1.16 V equilibrated CoCat film. The "+1.16 V equilibrated CoCat film" was obtained from $H_2$—CoCat equilibrated at +1.16 V for 4 min in a Co-free KP$_i$ solution and rapidly frozen in liquid nitrogen. The $O_2$—CoCat film was electro-deposited on a indium tin oxide electrode at +1.19 V vs Ag/AgCl for 70 min from an aqueous solution containing 0.1 M potassium phosphate (KP$_i$, pH 7) and 0.5 mM Co$^{2+}$ and rapidly frozen in liquid nitrogen.

Figure 13A:
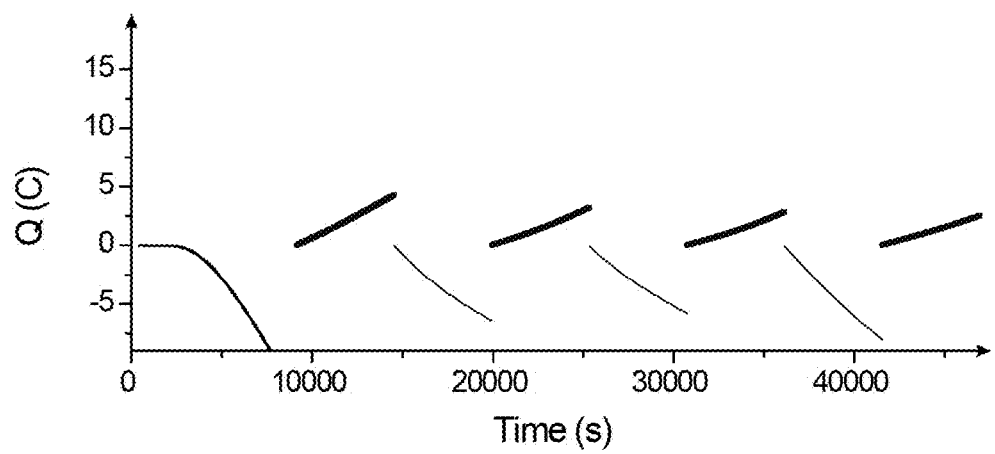
Figure 13B:
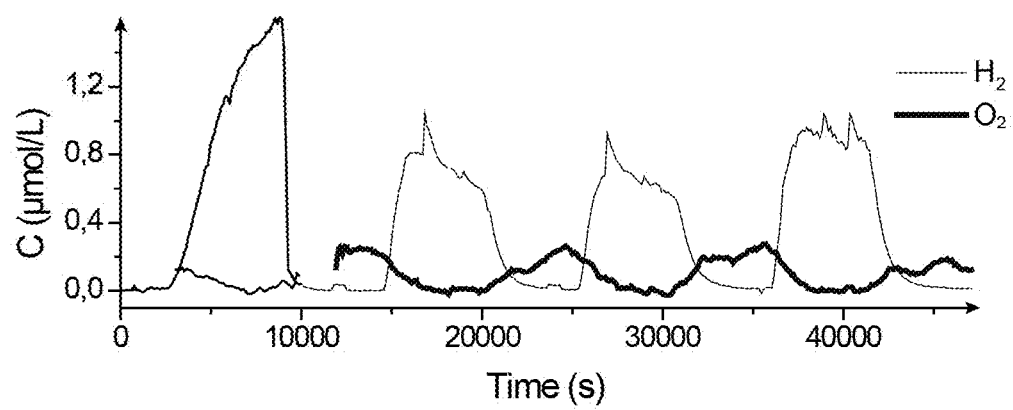

FIG. 13B presents the charge passed through a FTO electrode (1 cm$^2$) during controlled potential coulometry initially at −1.0 V vs Ag/AgCl (3 h, $H_2$—CoCat deposition) in 0.5 mol·L$^{-1}$ KPi, pH 7 electrolyte containing Co(DO) (DOH)pnCl$_2$ (0.5 mM) and after transfer to a cobalt-free 0.5 mol·L$^{-1}$ KPi, pH 7 electrolyte, with potential switching between oxidative (bold, 1.16 V vs Ag/AgCl) and reductive conditions (plain, −1 V vs Ag/AgCl), while FIG. 13A presents the hydrogen (plain) and oxygen (bold) evolution quantified through gas chromatography measurements during the same experiment. $N_2$ was continuously bubbled through the electrolyte at a constant flow (5 mL·min$^{-1}$) during the experiment and the concentration of $O_2$ and $H_2$ in the output gas was determined every 2 min by gas chromatography.

DETAILED DISCUSSION OF PARTICULAR EMBODIMENTS

I. Experimental Section

I.1. Materials.

The cobalt complexes used hereinafter to prepare $H_2$—CoCat are [Co(DO)(DOH)pnCl$_2$] [15] and [Co (dmgBF$_2$)$_2$(H$_2$O)$_2$] with dmgH$_2$ representing dimethylglyoxime [27] were prepared according to previously described procedure.

Fluorine doped tin oxide (FTO) coated glass slides with 7-10 Ω/sq surface resistivity and a thickness of 6000 Å were purchased from Solems (France).

KH$_2$PO$_4$ (98-100.5%) and K$_2$HPO$_4$ (99%) were purchased from Carlo Erba and Acros Organics respectively. ZnCl$_2$ (Fluka, purity >98%)) and KCl (Fluka, purity 99.5%) analytical reagent grade were used for ZnO preparation without further purification.

A three-electrode electrochemical cell was used for ZnO nanorods deposition on FTO substrates. The electrochemical growth was done at E=−1.0 V vs SCE, passed charge density 10 and 30 C·cm$^{-2}$ and T=80° C.

Further details can be found in [28].

I.2. Methods.

X-ray photoemission spectroscopy (XPS) analyses were performed with a Kratos Axis Ultra DLD using a high-resolution monochromatic Al—Kα line X-ray source at 1486.6 eV. Fixed analyzer pass energy of 20 eV was used for core level scans. Survey spectra were captured at pass energy of 160 eV. The photoelectron take-off angle was normal to the surface, which provided an integrated sampling depth of approximately 15 nm. All spectra were referenced with an external gold substrate with a binding energy of 84.0 eV for Au 4f. For quantification, relative sensitivity factors issued from Wagner's publication were used [29]. The amount of carbon varies from samples and corresponds to carbon contamination from the atmosphere and/or ethanol washing after electrodeposition.

SEM images and EDX spectra were recorded with a FEG-SEM (Leo 1530) operating at 5 kV and equipped with a Princeton Gamma-Tech EDX system operating at 15 kV. Electrochemical analysis was done using a Bio-logic SP300 potentiostat. FTO was preferred to graphite and ITO (indium-tin oxide) as the electrode material to minimize background $H_2$ evolution and avoid reductive degradation of the ITO substrate [30,31] respectively.

Cyclic voltammograms are shown using two different potential scales: first, potential is quoted against the Ag/AgCl reference electrode. Second, to ease reading the graphs in terms of overpotentials, potentials are also quoted against the Reversible Hydrogen Electrode (ie the apparent standard potential of the $H^+/H_2$ couple at the given pH).

The potential of the Reversible Hydrogen Electrode (RHE) is defined as $E^{RHE}$=−0.059 pH. Thus potentials measured versus the Ag/AgCl electrode can be converted versus the RHE by using the following formula: $E_{vs\_RHE}$=$E_{vs\_Ag/AgCl}$+$E°$ Ag/AgCl+0.059 pH. The $[Fe(CN)_6]^{3-}/[Fe(CN)_6]^{4-}$ couple ($E°$=0.20 V vs Ag/AgCl in phosphate buffer at pH=7) has then been used for the standardisation of the measurements.

The electrochemical experiments were carried out in a three electrode cell consisting of two compartments separated by a glass frit. The catalyst was assembled on a working electrode of FTO-coated glass of 1 cm$^2$ and rinsed with acetone and deionized water prior to use. Connection of the FTO to the potentiostat was made via an alligator clip. The platinum-grid counter electrode was placed in a separate compartment connected by a glass-frit and filled with the electrolytic solution. The potential has been calibrated after each experiment by adding potassium ferrocyanide in the solution and measuring its half-wave potential.

During controlled-potential coulometry and linear sweep voltammetry experiments, the cell was flushed with nitrogen (5 ml·min$^{-1}$) and the output gas was sampled (100 µl) every 2 min and analysed in a Perkin-Elmer Clarus 500 gas chromatograph equipped with a porapack Q 80/100 column (6⅛") thermostated at 40° C. and a TCD detector thermostated at 100° C.

I.3. Deposition Procedure.

Before starting the deposition, the FTO substrate is cycled hundreds of times between −1 V and +1 V in 0.5 M potassium phosphate buffer (KPi), pH 7.0 to ensure the stability and reproducibility of experiments.

Catalyst films were grown by controlled potential electrolysis of freshly prepared 0.1 mM Co(DO)(DOH)pnCl$_2$ solution and in 0.5 M KPi, pH 7.0. Performing the electrolysis at −1 V (vs Ag/AgCl) gives rise to a catalyst film of several micrometer thickness formed by nanoparticles after a course of around three hours.

During this time, a film is formed on the working electrode surface. After the film formation is completed, the substrate is transferred to a cobalt-free 0.5 M KPi, pH 7.0, with potential set to reductive conditions (−1 V vs Ag/AgCl).

Photodeposition was carried out by immersing ZnO electrode in a UV cell of freshly prepared 0.5 mM or 0.1 mM Co(DO)(DOH)pnCl$_2$ solution and in 0.1 M KPi, pH 7.0 and illuminating the samples using a UV-handlamp for 3 h (VL-6LC, λ=254 nm).

I.4. XAS Sample Preparation and Data Collection.

The glassy carbon substrates (SIGRADUR K, thickness 100 µm) had a surface resistivity of 2-15 Ω/sq and were from HTW Hochtemperatur-Werkstoffe GmbH. $KH_2PO_4$ (99.5%) and $K_2HPO_4$ (99.5%) were purchased from AppliChem.

For preparing the XAS samples, the inventors employed a single compartment, three electrode setup driven by an SP-200 potentiostat from BioLogic. The electrochemical cell consisted of a sample frame for XAS measurements glued (Momentive, SCNC silicone glue) on a glassy carbon substrate (working electrode) and a Pt wire (counter electrode) attached on the inner side of the frame. An Hg/HgSO$_4$ reference electrode (−440 mV vs Ag/AgCl) was approached close to the center of the frame.

Aqueous solutions of $KH_2PO_4$ (0.5 M) and $K_2HPO_4$ (0.5 M) were mixed until the KP$_i$ mixture reached a pH of 7.0. This electrolyte was pipetted into the sample frame until the liquid reached the reference electrode. The overall ohmic resistance of the electrochemical cell was determined by impedance spectroscopy and then used as set value for the applied IR compensation. The electrochemical background of the glassy carbon substrate was low, as verified by cyclic voltammetry.

For the formation of the Co film, 0.5 mM Co(DO)(DOH)pnCl$_2$ was added and a voltage of −1.0 V vs Ag/AgCl was applied for 3 h. Then the cobalt solution was replaced by (cobalt-free) KP$_i$ via pipetting. Four CVs from −1.21 V to −0.56 V vs Ag/AgCl (scan rate: 20 mV/s) were performed to characterize the Co deposit.

Finally, the Co film was equilibrated at −1 V vs Ag/AgCl for 4 min and then rapidly frozen in a bath of liquid nitrogen. The reference electrode was removed before freezing to avoid any damage to the electrode by immersion in liquid nitrogen. However the potential between the working and the counter electrode was kept constant by applying the same voltage that had been present before removing the reference electrode (using a standard DC power supply connected to working and counter electrode). The power supply was disconnected after freezing in liquid nitrogen.

X-ray absorption spectra were collected at beamline KMC1 of the BESSY, a synchrotron radiation source operated by the Helmholtz Zentrum Berlin (HZB). Spectra were collected at 20 K in absorption and fluorescence mode as described elsewhere [3].

II. Results

II.1. Preparation of Catalytic Material.

A. By Reductive Electrode Position.

FIG. 1 shows the results obtained during a linear sweep voltammetry experiment (plain black trace, 0.05 mV·s$^{-1}$) of a Co(DO)(DOH)pnCl$_2$ solution (0.1 mM) in KPi (0.5 M, pH 7) at an FTO electrode. A reductive process is observed with onset at −0.9 V vs Ag/AgCl. Simultaneous chromatographic monitoring of $H_2$ production (dotted black trace) indicates that no hydrogen is produced at this point. If the electrode potential is switched to more negative values (below −0.95 V vs Ag/AgCl) $H_2$ is produced.

To provide more insights into the reductive process at work at the onset of the wave, the inventors carried out an electrolysis experiment at −0.9 V vs Ag/AgCl for 1 h (Q=0.1 $C \cdot cm^{-2}{}_{geometric}$), which resulted in a grey coating of the electrode. The catalytic material thus obtained is hereafter named $H_2$—CoCat.

Figure 2B:
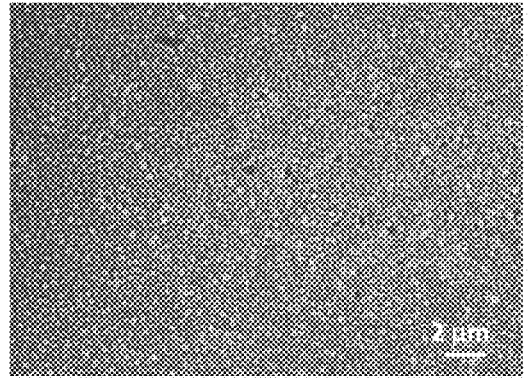
Figure 2C:
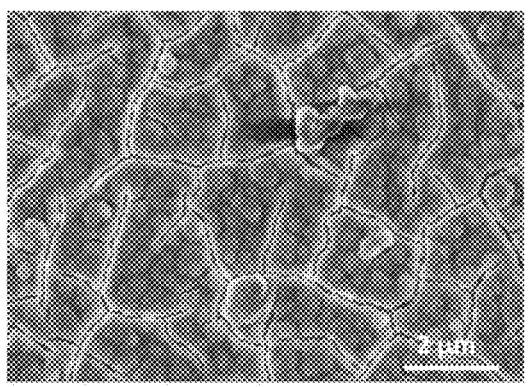
Figure 2D:
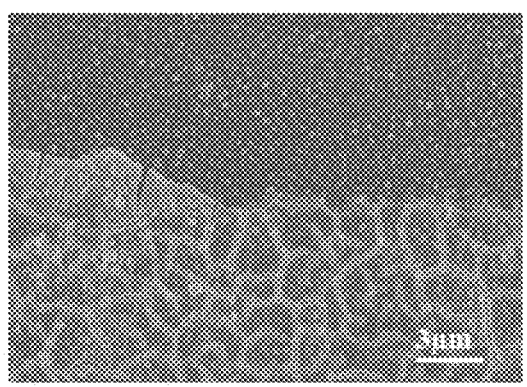

The scanning electronic micrograph (FIG. 2A) shows isolated nanoparticles with an average ~10 nm in diameter. Performing the same electrolysis but at −1.0 V vs Ag/AgCl for 3 h yields a film of ~2 m thickness made from larger particles (100 nm) as shown by FIG. 2B. During this experiment the current density stabilizes to a value of 2 $mA \cdot cm^{-2}{}_{geometric}$. Neither the use of a longer electrolysis time nor a second electrolysis experiment in a new solution of the cobalt complex could increase the current density.

The modified electrode was then transferred to a Co-free KPi electrolyte and its electrocatalytic properties were quantified using gas chromatography (bold traces in FIG. 1). Hydrogen evolution could be detected for overpotential values as low as 50 mV and overpotential values of 270 mV and 385 mV are required to reach current density values of 0.5 $mA \cdot cm^{-2}{}_{geometric}$ and 2 $mA \cdot cm^{-2}{}_{geometric}$ respectively. Overpotential values can be directly obtained from figures plotting current densities or the amount of evolved $H_2$ as a function of the electrochemical potential values scaled versus the Reversible Hydrogen electrode (RHE). Indeed, $H_2$ evolved with quantitative faradic yield within the experimental accuracy. It should be noted that these overpotential values are much lower than those reported with cobalt-based molecular catalysts assayed under aqueous solutions. For instance, Co macrocycles generally require overpotentials of 500 mV to 700 mV [13] and a recently described pentadentate polypyridyl cobalt complex catalyzes $H_2$ evolution with onset of the catalytic current occurring for an overpotential of 660 mV [32].

$H_2$—CoCat appears to be stable as long as the electrode is kept at a potential more negative than about −0.6 V vs Ag/AgCl. When poised at a more positive potential, or left at open-circuit potential, the catalytic film readily dissolves in the electrolyte yielding Co(II) species. By ICP-MS titration of Co(II) ions in the electrolyte after full redissolution, the inventors determine that $1.0 \; 10^{-6}$ mol of cobalt are deposited per geometric $cm^{-2}$, from which the inventors derive a $H_2$ evolution turnover frequency of 80 $h^{-1}$ per Co center at 385 mV overpotential.

B. By a Photochemical Deposition.

Finally the inventors observed that $H_2$—CoCat can also be deposited through a photochemical procedure.

The inventors chose ZnO because the energy level of its conduction band is suitable for $H_2$ evolution from neutral aqueous solutions. ZnO nanorods with high specific surface area (FIG. 3A) were irradiated by UV-light in Co(DO)(DOH)pnCl$_2$ (0.1 mM) in 0.1 M KPi, resulting in the deposition of particles (FIG. 3B).

Gas chromatographic analysis of the headspace of the vial in the course of this experiment (FIG. 4) shows that only $O_2$ is evolved, consistent with a light driven reductive deposition of $H_2$—CoCat thanks to electrons provided by water oxidation.

II.1. Characterization of the Catalytic Material.

The structure of the new material was characterized by X-ray photoelectron spectroscopy (XPS), Energy Dispersive X-ray (EDX) spectroscopy, X-ray absorption near-edge structure (XANES) and extended X-ray absorption fine-structure (EXAFS) spectroscopies.

The XPS spectrum of freshly electro-deposited $H_2$—CoCat, recorded under limited air exposure conditions, shows the presence of cobalt, phosphorus and oxygen (FIG. 5) and was comparable to that of commercially available $Co_3(PO_4)_2 \cdot xH_2O$. No significant signals are found in the N1s region confirming that the organic ligand is completely split up from with the cobalt ion during the cathodic deposition process. The analysis of the $P_{2p}$ region of both samples shows two sharp peaks with 133.4 eV and 134.4 eV binding energies (ratio of 2:1) corresponding to the $2p_{3/2}$ and $2p_{1/2}$ core levels of central phosphorus atom in phosphate species [33]. In the Co region, two broad sets of signals corresponding to $2p_{3/2}$ (782 eV) and $2p_{1/2}$ (798 eV) core levels are observed, excluding the presence of metallic cobalt (778.0 eV) at the surface of the $H_2$—CoCat coating. $O_{1s}$ signals are centered for both materials at 531.7 eV. P/Co/O ratios are however significantly different with a slight excess of cobalt and oxygen for $H_2$—CoCat (2:3.9:11.6) as compared to $Co_3(PO_4)_2 \cdot xH_2O$ (2:3:11.1).

As the $Co_{2p}$ and $O_{1s}$ core levels binding energies [34] of cobalt oxides and hydroxides are in the same range as those of cobalt phosphate, the inventors tentatively describe the surface of electrodeposited $H_2$—CoCat as a combination of cobalt(II) phosphate with a cobalt oxo/hydroxo species $Co_xO_y(OH)_z$, probably in the Co(II) state as observed for native cobalt oxide/hydroxide that forms at the surface of metallic cobalt.

EDX spectra (FIG. 6) confirm the presence of Co, P and O together and additional signals arise from silicon and tin from FTO coated glass substrate. Since EDX, which probes deeply into the cathodically deposited film, indicates a Co/P ratio of 5:1, whereas XPS, which probes only a few nanometers below the surface, indicates a 1:2 Co/P ratio, the inventors conclude that $H_2$—CoCat is not homogeneous in composition between bulk and surface.

The absence of crystalline features in the powder low-angle X-ray diffraction pattern recorded at low angles and in the electron diffraction patterns recorded in a transmission electron microscope indicates the amorphous nature of $H_2$—CoCat. For insight into the atomic structure, X-ray absorption spectra were collected at the Co K-edge after $H_2$—CoCat formation and fast freezing of the still-wet electrode in liquid nitrogen (quasi-in situ measurements) as described earlier [3]. When deposition (paralleled by catalytic $H_2$ evolution) was achieved at −1.0 V vs Ag/AgCl, XANES and EXAFS measurements suggest a dominating contribution of the hexagonal close-packed phase of metallic cobalt (FIG. 7 and FIG. 8). However, the magnitude of EXAFS oscillation is by about 40% smaller than observed for a Co metal foil and furthermore the edge spectra (insert in FIG. 7) suggest a sizeable non-metallic contribution. An appropriate subtraction of the metallic contribution results in an EXAFS spectrum that suggests the presence of light atoms (O, N, C) in the first Co coordination sphere (FIG. 8D), but the determination of bond lengths by EXAFS simulations is prevented by noise problems in conjunction with uncertainties in the approach used to correct for the dominating contributions of the metallic cobalt.

All these data indicate that the new material is made of nanoparticles with a cobalt oxo/hydroxo phosphate component mostly located at the surface and metallic cobalt in the bulk.

II.3. Transformation in Water Oxidation Catalyst.

Poising the $H_2$—CoCat electrode at a fairly positive potential (+1.16 V vs Ag/AgCl) resulted in a stable anodic current density of 1 mA·cm$^{-2}$ (FIG. 10) and concomitant oxygen evolution with quantitative faradaic yield. SEM observations of the electrode after 90 min (FIG. 2C) shows a homogeneous thin film, with cracks originated from drying, very similar to those obtained for the $O_2$—CoCat material reported in 2008 by Kanan and Nocera [2,3].

In order to characterize the electrocatalytic material after this redox shift a detailed analysis by EDX, XPS and X-ray absorption spectroscopy has been carried out. According to EDX spectra (FIG. 6B) the Co:P ratio is 1:2.5, which differs significantly from the 2:1 ratio previously reported for the anodically deposited $O_2$—CoCat [2]. XPS analysis confirms the large phosphorus accumulation in the oxidized film (FIG. 11).

On the other hand, the XANES and EXAFS spectra (FIGS. 5 and 12) of $H_2$—CoCat films equilibrated at +1.16 V vs Ag/AgCl, indicate that already about 50% of the Co film has enjoyed a transformation resulting in a Co oxide, consisting of clusters of edge-sharing $Co^{III}O_6$ octahedra [3,4], similar to that found in $O_2$—CoCat. The coexistence of metallic cobalt with $O_2$—CoCat in the anodically equilibrated material clearly shows that the catalytic response occurs outside of an electrochemical equilibrium, with the oxidizing equivalents being used for water oxidation preferentially, protecting the major part of the cobalt coating from oxidation.

This observation parallels the recent report by Nocera et al. regarding the anodic oxidation of a 800 nm sputtered cobalt film for the preparation of $O_2$—CoCat [35].

After cathodic deposition, alternate switches between oxidative (+1.71 V vs RHE, bold traces in FIG. 13) and reductive conditions (−385 mV vs RHE, plain traces in FIG. 13) show that the deposited material can catalyze both water oxidation and $H_2$ evolution respectively.

Importantly the inventors could not evidence any decrease in activity for both $H_2$ and $O_2$ evolution after several switches. The inventors conclude that the $H_2$—CoCat film rapidly, reversibly and reproducibly commute with the $O_2$—CoCat form.

From the current densities and chromatographic measurements, the inventors derive turnover frequencies of 10 and 80 h$^{-1}$ per Co center at 480 and 385 mV overpotential for $O_2$ and $H_2$ evolution respectively. In order to determine whether this reversible transformation proceeds through the complete dissolution of one form of the CoCat film followed by the electrodeposition of the other form, the inventors stopped the experiment before current stabilization after a switch from reductive to oxidative conditions.

SEM analysis then reveals the coexistence of different domains at the surface of the electrode (FIG. 2D) corresponding to both morphologies. This clearly stands for a progressive and local transformation of the material.

This last observation finally provides a rationale for the fact that photochemically deposited $H_2$—CoCat on ZnO nanorods can be used as an electrocatalytic material for water oxidation, as previously described by Steinmiller and Choi [36]. Actually these authors initially interpreted the photodeposition of Co(II) salts on ZnO nanorods as the formation of $O_2$—CoCat. The inventors' results establish that $O_2$ and not $H_2$ evolved during the photochemical process which definitively demonstrates that the deposition of the material does not proceed through the oxidation of the Co(II) ions (equation 1) with concomitant $O_2$ or water reduction as previously stated. Rather $H_2$—CoCat is formed through the reduction of the Co(II) ions (equations 2) thanks to photogenerated electrons in the conduction band paralleled by water oxidation (equation 3) by holes remaining in the valence band. Both the observed nanoparticle-based morphology and the similar Co/P ratio derived from EDX analysis support this conclusion. When no more Co(II) ions are present in the solution, light is used by the $H_2$—CoCat coated ZnO nanorods to split water and produce both $O_2$ and $H_2$ (FIG. 4, [Co$^{2+}$]=0.05 mM).

However, if this material is electrochemically poised at an anodic potential and irradiated, as in the study by Steinmiller and Choi [36], $H_2$—CoCat equilibrates with the valence band potential of ZnO, transforms into $O_2$—CoCat and finally mediates water oxidation.

$Co^{2+} \rightarrow O_2$—CoCat+$e^-$   Eq. 1

$Co^{2+}+2e^- \rightarrow H_2$—CoCat   Eq. 2

$2H_2O \rightarrow O_2+4H^++4e^-$   Eq. 3

III. Conclusion

The inventors have discovered that cobalt complexes can be used for the deposition of a new nanoparticulate cobalt-based material ($H_2$—CoCat) consisting of elemental cobalt covered by a cobalt oxo/hydroxo phosphate compound. The latter proves active as a catalyst material for hydrogen evolution under strictly neutral conditions, which bridges the gap between noble metal nanoparticles, active under highly acidic conditions, and classical Ni or Co-based metallic compounds [37] and catalysing $H_2$ evolution under strongly alkaline conditions.

$H_2$—CoCat can be reversibly transformed through anodic equilibration into a cobalt oxide material catalyzing water oxidation ($O_2$—CoCat). An important finding is that the switch between the two catalytic phases—$H_2$ evolution and water oxidation—is highly reversible and corresponds to a local interconversion between two morphologies at the surface of the electrode. After deposition, the coating thus functions as a robust, bifunctional and switchable catalyst.

To the best of the inventors' knowledge, such a property is not found except for noble metal catalysts such as Pt. These results open new pathways for the deposition of cobalt oxide film onto materials, such as ZnO or quantum dots, that do not withstand harsh anodic conditions.

Additionally, they now make it possible to design an electrocatalytic water-splitting cell working under neutral conditions and based on cobalt ions as the sole precursors. In such a device, the catalytic materials will spontaneously self-assemble on both electrodes from a cobalt or nickel organic complex upon switching on. In addition, it will be insensitive to material cross-transfers processes when the system is switched off and on.

REFERENCES

1. Lewis, N. S.; Nocera, D. G. *Proc. Natl. Acad. Sci. USA* 2007, 104, 20142-20142
2. Kanan, M. W.; Nocera, D. G. *Science* 2008, 321, 1072-1075.
3. Risch, M.; Khare, V.; Zaharieva, I.; Gerencser, L.; Chernev, P.; Dau, H. *J. Am. Chem. Soc.* 2009, 131, 6936-6937
4. Dau, H.; Limberg, C.; Reier, T.; Risch, M.; Roggan, S.; Strasser, P. *ChemCatChem* 2010, 2, 724-761
5. Dinca, M.; Surendranath, Y.; Nocera, D. G. *Proc. Natl. Acad. Sci. USA* 2010, 107, 10337-10341
6. Jiao, F.; Frei, H. *Energy Environ. Sci.* 2010, 3, 1018-1027
7. Zaharieva, I.; Najafpour, M. M.; Wiechen, M.; Haumann, M.; Kurz, P.; Dau, H. *Energy Environ. Sci.* 2011, 4, 2400-2408

8. Tran, P. D.; Le Goff, A.; Heidkamp, J.; Jousselme, B.; Guillet, N.; Palacin, S.; Dau, H.; Fontecave, M.; Artero, V. *Angew. Chem. Int. Ed.* 2011, 50, 1371-1374
9. Le Goff, A.; Artero, V.; Jousselme, B.; Tran, P. D.; Guillet, N.; Metaye, R.; Fihri, A.; Palacin, S.; Fontecave, M. *Science* 2009, 326, 1384-1387
10. Hou, Y. D.; Abrams, B. L.; Vesborg, P. C. K.; Bjorketun, M. E.; Herbst, K.; Bech, L.; Setti, A. M.; Damsgaard, C. D.; Pedersen, T.; Hansen, O.; Rossmeisl, J.; Dahl, S.; Norskov, J. K.; Chorkendorff, I. *Nat. Mater.* 2011, 10, 434-438
11. Reece, S. Y.; Hamel, J. A.; Sung, K.; Jarvi, T. D.; Esswein, A. J.; Pijpers, J. J. H.; Nocera, D. G. *Science* 2011
12. Gordon, R. B.; Bertram, M.; Graedel, T. E. *Proc. Natl. Acad. Sci. USA* 2006, 103, 1209-1214
13. Artero, V.; Chavarot-Kerlidou, M.; Fontecave, M. *Angew. Chem. Int. Ed.* 2011, 50, 7238-7266
14. Baffert, C.; Artero, V.; Fontecave, M. *Inorg. Chem.* 2007, 46, 1817-1824
15. Jacques, P.-A.; Artero, V.; Pécaut, J.; Fontecave, M. *Proc. Natl. Acad. Sci. U.S.A.* 2009, 106, 20627-20632
16. Dempsey, J. L.; Winkler, J. R.; Gray, H. B. *J. Am. Chem. Soc.* 2010, 132, 16774-16776
17. Fourmond, V.; Jacques, P. A.; Fontecave, M.; Artero, V. *Inorg. Chem.* 2010, 49, 10338-10347
18. International application WO 2010/046774 in the name of CEA and published on Apr. 29, 2010
19. Pantani, O.; Anxolabehere-Mallart, E.; Aukauloo, A.; Millet, P. *Electrochem. Commun.* 2007, 9, 54-58
20. International application WO 2009/098403 in the names of Université Paris Sud and CNRS, and published on Aug. 13, 2009
21. McCrory, C. C. L.; Uyeda, C.; Peters J. C. *J. Am. Chem. Soc.* 2012, 134, 3164-3170
22. Anxolabehere-Mallart, E.; Costentin, C.; Fournier, M.; Nowak, S.; Robet, M.; Savéant, J. M. *J. Am. Chem. Soc.* 2012, dx.doi.org/10.1021/ja301134e
23. Kraeutler, B.; Bard, A. J. *J. Am. Chem. Soc.* 1978, 100, 4317-4318
24. Zhong, D. K.; Cornuz, M.; Sivula, K.; Graetzel, M.; Gamelin, D. R. *Energy Environ. Sci.* 2011, 4, 1759-1764
25. Soto, A. B.; Arce, E. M.; PalomarPardave, M.; Gonzalez, I. *Electrochimica Acta* 1996, 41, 2647-2655
26. Cui, C. Q.; Jiang, S. P.; Tseung, A. C. C. *Journal of the Electrochemical Society* 1990, 137, 3418-3423
27. Bakac, A.; Espenson, J. H. *J. Am. Chem. Soc.* 1984, 106, 5197-5202
28. Sanchez, S.; Salazar, R.; Lévy-Clément, C.; Ivanova, V. *ECS Trans.* 2011, 33, 183
29. Wagner, C. D.; Davis, L. E.; Zeller, M. V.; Taylor, J. A.; Raymond, R. M.; Gale, L. H. *Surf. Interface Anal.* 1981, 3, 211
30. Monk, P. M. S.; Man, C. M. *Journal of Materials Science—Materials in Electronics* 1999, 10, 101-107
31. Senthilkumar, M.; Mathiyarasu, J.; Joseph, J.; Phani, K. L. N.; Yegnaraman, V. *Mater. Chem. Phys.* 2008, 108, 403-407
32. Sun, Y.; Bigi, J. P.; Piro, N. A.; Tang, M. L.; Long, J. R.; Chang, C. J. *J. Am. Chem. Soc.* 2011, 133, 9212-9215
33. Hu, G.-R.; Deng, X.-R.; Peng, Z.-D.; Du, K. *Electrochim. Acta* 2008, 53, 2567-2573
34. Yang, J.; Liu, H.; Martens, W. N.; Frost, R. L. *The Journal of Physical Chemistry C* 2009, 114, 111-119
35. Young, E. R.; Nocera, D. G.; Bulovic, V. *Energy Environ. Sci.* 2010, 3, 1726-1728
36. Steinmiller, E. M. P.; Choi K.-S. *Proc. Natl. Acad. Sci. U.S.A.* 2009, 106, 20633-20636
37. Miles, M. H. *J. Electroanal Chem.* 1975, 60, 89

The invention claimed is:

1. A method for the preparation of a catalyst onto a solid support of a conductive or semiconductive material, the method comprising:
depositing said catalyst onto said solid support from a near-neutral aqueous solution containing at least one nickel or cobalt organic complex and at least one basic oxoanion, using a method selected from the group consisting of reductive electrodeposition, photochemical electrodeposition, and photoelectrochemical deposition,
wherein the catalyst consists of elemental cobalt/nickel covered or coated by a cobalt/nickel oxo/hydroxo-oxoanion layer.

2. The method according to claim 1, wherein the conductive or semiconductive material of said solid support is selected from the group consisting of a metallic material, a carbon material, a semiconductor or conductor metal oxide, nitride, and chalcogenide.

3. The method according to claim 1, wherein the conductive or semiconductive material of said solid support is selected from the group consisting of silicon, brass, stainless steel, iron, copper, nickel, cobalt, aluminium, silver, gold, titanium, carbon black, single or multi-walled carbon nanotubes (CNT), fullerenic nanoparticles, graphite, glassy carbon, graphene, reduced graphene oxide, doped diamond, $TiO_2$, NiO, ZnO, $ZrO_2$, ITO, $SnO_2$, $WO_3$, $Fe_2O_3$, $BiVO_4$, $Ta_2O_5$, $Ta_3N_5$, TaON, ZnS, ZnSe, CdS, CdSe, CdTe, ZnTe, and composites of these materials, possibly doped with other elements.

4. The method according to claim 1, wherein the near-neutral aqueous solution has a pH of between 5 and 9.

5. The method according to claim 1, wherein the near-neutral aqueous solution has a pH of between 6 and 8.

6. The method according to claim 1, wherein the near-neutral aqueous solution has a pH of between 6.3 and 7.7.

7. The method according to claim 1, wherein the near-neutral aqueous solution has a pH of between 6.5 and 7.5.

8. The method according to claim 1, wherein the near-neutral aqueous solution has a pH of between 6.7 and 7.3.

9. The method according to claim 1, wherein the near-neutral solution is an aqueous solution having a pH of 7.

10. The method according to claim 1, wherein said cobalt or nickel organic complex is selected from the group consisting of cobalt or nickel dioxime/diimine complex; and cobalt or nickel amine/imine/pyridine complex.

11. The method according to claim 1, wherein said cobalt or nickel organic complex is selected from the group consisting of [Co(DO)(DOH)pnCl$_2$] with (DOH)(DOH)pn representing $N^2,N^{2'}$-propanediylbis(2,3-butandione 2-imine 3-oxime); [Co(DO)(DOH)pnBr$_2$]; [Co((DO)$_2$BF$_2$)pnBr$_2$] with ((DO)$_2$BF$_2$)pn representing $N^2,N^{2'}$-propanediylbis(2,3-butandione 2-imine 3-oximato)-$N^1,N^{1'}$-difluoroboryl [Co(MO)(MOH)pnCl$_2$] with (MOH)(MOH)pn representing $N^2,N^{2'}$-propanediylbis(1,2-propandione 2-imine 1-oxime); [Ni((CO)$_2$BF$_2$)pn](ClO$_4$); [Co(dmgBF$_2$)$_2$(H$_2$O)$_2$] with dmgH$_2$ representing dimethylglyoxime; [Co(dmgH)$_2$pyCl]; [Co(dmgH)$_2$(OH$_2$)$_2$]; [Co(dmgBF$_2$)$_2$(DMF)$_2$]; [Co(dmgBF$_2$)$_2$(CH$_3$CN)$_2$]; [Co(dpgBF$_2$)$_2$(H$_2$O)$_2$] with dpgH$_2$ representing diphenylglyoxime; [Co(dpgBF$_2$)$_2$(DMF)$_2$]; [Co(dpgBF$_2$)$_2$(CH$_3$CN)$_2$]; [Ni(dmgBF$_2$)$_2$]; [Ni(dmgH)$_2$] [Ni(DO)(DOH)pn](ClO$_4$); [Ni(MO)(MOH)pnCl]; [Ni((DO)$_2$BF$_2$)pn](ClO$_4$); [Co(DO)(DOH)pnBr(PPh$_3$)]; [Co(DO)

(DOH)pn(PPh$_3$)]; [Co(dmg)$_3$(BF)$_2$]$^+$; [Co(dpg)$_3$(BF)$_2$]$^+$; [Co(dmg)$_3$(BPh)$_2$]$^{0/1+}$ and [Co(dpg)$_3$(BPh)$_2$]$^{0/1+}$.

12. The method according to claim 1, wherein said basic oxoanion is selected from the group consisting of a phosphate, carbonate, arsenate, borate, vanadate, chromate, phosphonate, phosphite, nitrate, nitrite, sulphate, sulphonate, molybdate, and tungstate.

13. The method according to claim 1, wherein the reductive electrodeposition comprises applying to said solid support a potential below −0.4 V versus Ag/AgCl.

14. The method according to claim 1, wherein the reductive electrodeposition comprises applying to said solid support a potential below −0.6 V versus Ag/AgCl.

15. The method according to claim 1, wherein the reductive electrodeposition comprises applying to said solid support a potential below −0.8 V versus Ag/AgCl.

16. The method according to claim 1, wherein the reductive electrodeposition comprises applying to said solid support a potential of about −1 V versus Ag/AgCl.

17. A method for mediating hydrogen evolution comprising implementing the catalyst obtained by the preparation method according to claim 1.

18. The method according to claim 3, wherein the conductive or semiconductive material is doped with one or more elements other than said selected material.

* * * * *